(12) United States Patent
Logemann et al.

(10) Patent No.: US 11,420,301 B2
(45) Date of Patent: Aug. 23, 2022

(54) SYSTEMS AND METHODS OF PLATING STRUCTURAL MEMBERS

(71) Applicant: House of Design LLC, Nampa, ID (US)

(72) Inventors: Cole Jay Logemann, Nampa, ID (US); Shane Christopher Dittrich, Nampa, ID (US); Kristopher Ryan Okelberry, Nampa, ID (US)

(73) Assignee: House of Design LLC, Nampa, ID (US)

( * ) Notice: Subject to any disclaimer, the term of this patent is extended or adjusted under 35 U.S.C. 154(b) by 17 days.

(21) Appl. No.: 17/166,749

(22) Filed: Feb. 3, 2021

(65) Prior Publication Data
US 2021/0237215 A1 Aug. 5, 2021

Related U.S. Application Data

(60) Provisional application No. 62/969,570, filed on Feb. 3, 2020.

(51) Int. Cl.
*B23P 19/04* (2006.01)
*E04C 3/16* (2006.01)
*E04C 3/14* (2006.01)

(52) U.S. Cl.
CPC ............... *B23P 19/04* (2013.01); *E04C 3/14* (2013.01); *E04C 3/16* (2013.01)

(58) Field of Classification Search
CPC .... B23P 19/04; E04C 3/14; E04C 3/16; B27F 7/003; B27F 7/155
See application file for complete search history.

(56) References Cited

U.S. PATENT DOCUMENTS

| 4,989,444 A | 2/1991 | Murakami et al. | |
| 8,136,804 B2 * | 3/2012 | Leith | B27F 7/155 269/304 |

(Continued)

OTHER PUBLICATIONS

International Search Report and Written Opinion dated Apr. 12, 2021 for international application PCT/US2021/016460.

(Continued)

*Primary Examiner* — Ryan J. Walters
(74) *Attorney, Agent, or Firm* — Foley & Lardner LLP

(57) ABSTRACT

Plating systems and related methods are disclosed for prepping of structural members, such as splicing and/or pre-plating structural members. A plating system can include a splicing system and a pre-plating system. A splicing system include an infeed system, an outfeed system, and a press to affix or otherwise secure a plate to opposing surfaces of structural members to splice the structural members together. Guides are automatically positioned to guide short members through the splicing system. A pre-plating system includes a press, an infeed system configured to deliver a structural member to the press, and an outfeed system configured to remove the structural member from the press. The press is configured to secure a plate to the structural member on a surface other than the opposing surfaces used to splice the structural members together. A plate picking robot is configured to pick a plate from a plate container and position the plate on a press surface.

20 Claims, 27 Drawing Sheets

(56) References Cited

U.S. PATENT DOCUMENTS

| | | | | |
|---|---|---|---|---|
| 8,302,292 B2* | 11/2012 | McAdoo | ............... | B27F 7/155 |
| | | | | 901/50 |
| 8,725,285 B2* | 5/2014 | Irie | ............... | B25J 9/1687 |
| | | | | 29/407.04 |
| 8,818,547 B2* | 8/2014 | McAdoo | ............... | E04C 3/17 |
| | | | | 29/897.31 |
| 2003/0196326 A1* | 10/2003 | McAdoo | ............... | B23Q 1/032 |
| | | | | 29/432 |
| 2005/0011375 A1* | 1/2005 | Donohue | ............... | B27F 7/155 |
| | | | | 100/193 |
| 2010/0030363 A1 | 2/2010 | McAdoo et al. | | |
| 2011/0222995 A1 | 9/2011 | Irie et al. | | |
| 2020/0376685 A1 | 12/2020 | Baker et al. | | |

OTHER PUBLICATIONS

TCT Automation , "TCT Truss Assembly System", YouTube. Mar. 10, 2009 (Mar. 10, 2009) [retrieved on Jul. 12, 2020] Retrieved from Internet: <URL:https://www.youtube.com/watch?v=o9tJeCCGAKI> entire video. See pp. 9 and 10 of the ISA.237.

* cited by examiner

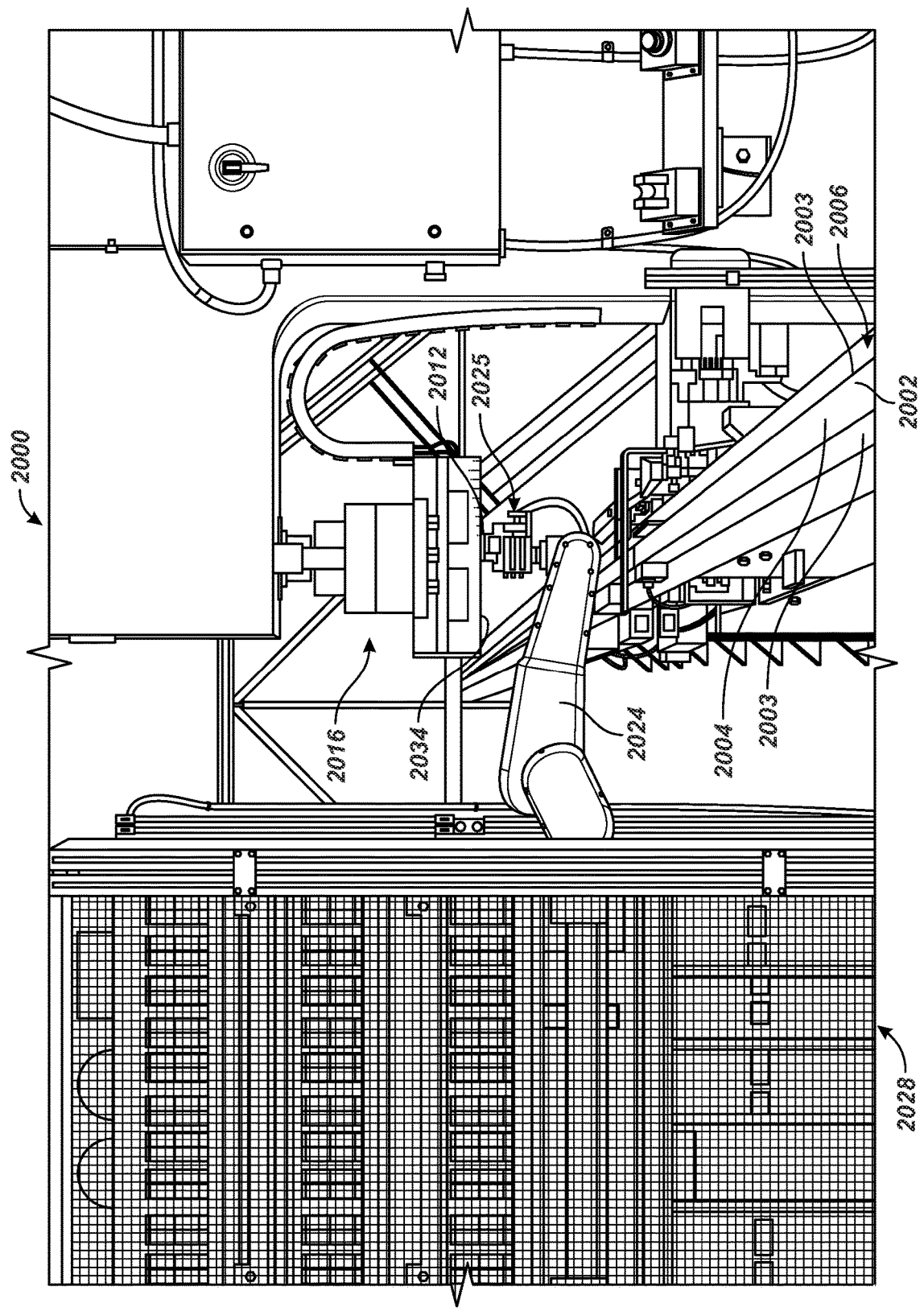

SYSTEMS AND METHODS OF PLATING STRUCTURAL MEMBERS

RELATED APPLICATIONS

This application claims priority to U.S. Provisional Patent Application No. 62/969,570, titled SYSTEMS AND METHODS OF PLATING STRUCTURAL MEMBERS, filed Feb. 3, 2020, the entirety of which is incorporated herein by reference.

TECHNICAL FIELD

The present disclosure relates to pre-fabrication of structures and/or structural components for building structures, and more specifically to plating structural members, such as by pre-plating joints and/or by splicing to interconnect structural members.

BACKGROUND

In constructing building components (e.g., trusses), plates (e.g., nail plates) are used in splicing together structural members. A plate may include teeth on a side of the plate that contacts the structural members to enable the plate to be coupled to the structural members by pressing the teeth into the structural members. A plate can interconnect two structural members to splice the two structural members together or to form a joint.

BRIEF DESCRIPTION OF THE SEVERAL VIEWS OF THE DRAWINGS

The written disclosure herein describes illustrative embodiments that are non-limiting and non-exhaustive. Reference is made to certain of such illustrative embodiments that are depicted in the accompanying drawings, in which:

FIG. 20B is a perspective view of the pre-plating plating station of FIG. 20A.

Figure 1A:
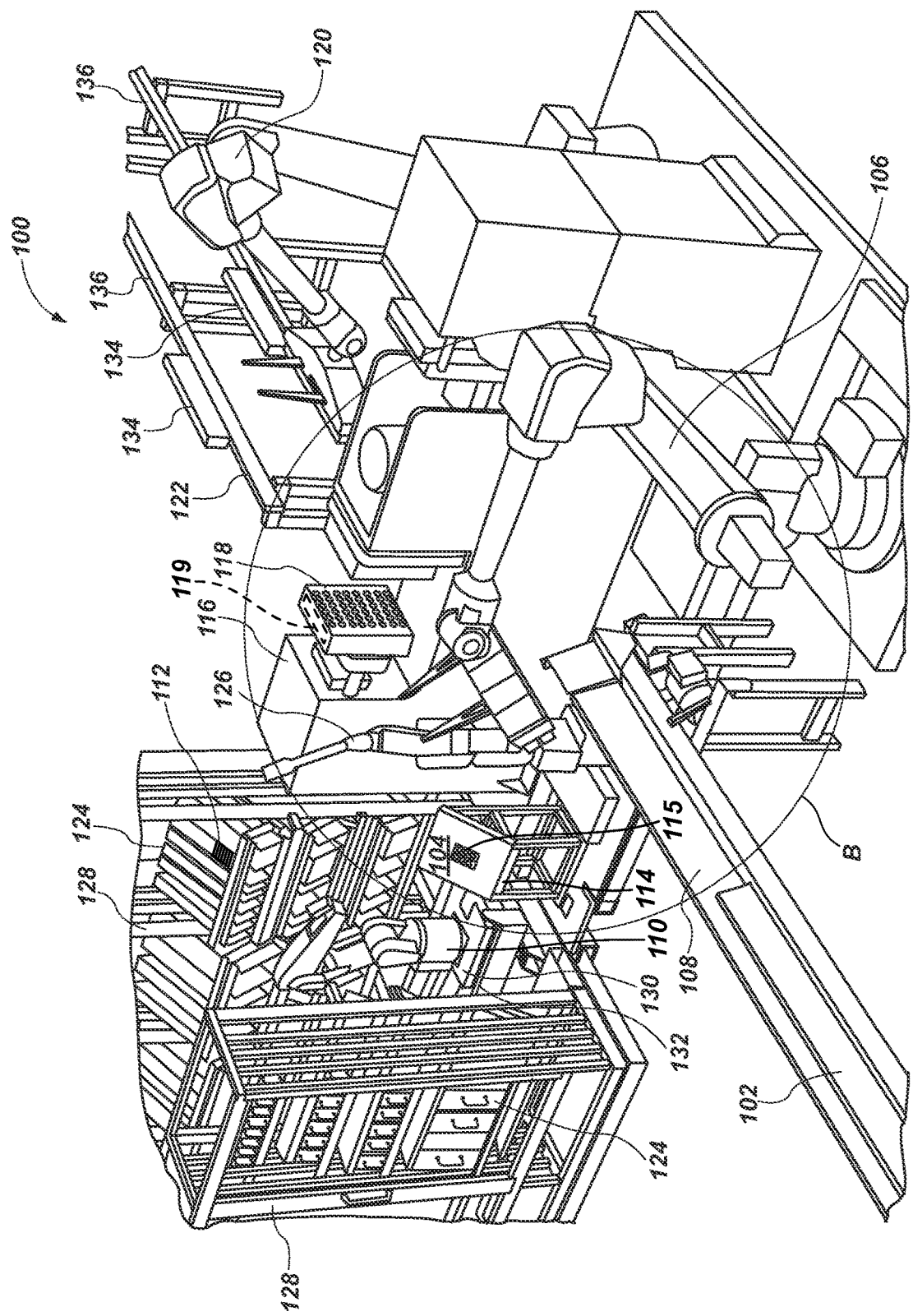
FIG. 1A is a perspective view of a pre-plating system, according to one embodiment of the present disclosure.

To easily identify the discussion of any particular element or act, the most significant digit or digits in a reference number refer to the figure number in which that element is first introduced.

DETAILED DESCRIPTION

In constructing building components such as trusses, plates (e.g., nail plates) can be used to splice together structural members (e.g., to form truss chords) and to join structural members at joints between (e.g., to join chords, verticals, diagonals). The plate may include teeth on a side of the plate that contacts a structural member (e.g., truss members) to enable the plate to be coupled to the structural members by pressing the teeth into the structural members. A plate can interconnect two structural members to splice and/or to form joints.

In the following detailed description, reference is made to the drawings. In some instances, like reference numerals are used in the various drawings to indicate similar elements.

As used herein, the noun "plate" refers to a plate to be used to join or interconnect two or more structural members. A plate may join two structural members end to end to create a splice and thereby create a longer structural member. A plate may also join two or more structural members together at an angle to form a joint. In some instances, a "plate" includes teeth for pressing into structural members and/or nail holes to enable nails to be driven through the plate to secure the plate to the structural member. A nail plate as is known in the construction industry is an example of a plate as used herein.

As used herein, the verb "plate" (and "plating," "plated") refers to application of a plate to at least one structural member. By way of non-limiting example, two structural members may be plated to form a chord of a truss.

As used herein, the verb "pre-plate" (and "pre-plating") refers to a particular type of plating, namely application of a plate to a first structural member preparatory to joining another structural member to the first structural member. By way of non-limiting example, a chord may be pre-plated preparatory to receiving a truss diagonal.

As used herein, the term "structural member" refers to a member to be used to construct a structure such as a building or other structure. For example, a structural member may be used to construct an architectural truss, which in turn may serve in construction of homes, other buildings, bridges, or other structures. In such examples, a structural member may include a truss member ("truss member"). In other words, a structural member may be a member to be combined with other members to form a building component (e.g., a truss) that, in turn, is used in construction of a building, bridge, etc. Examples of structural members include, without limitation, chords, chord members, vertical members, and diagonal members. In many embodiments, lumber is used to form (e.g., cut, drill, plane, etc.) structural members, though composite materials and other suitable materials for erecting structures can also be used.

As used herein, the term "robot" refers to a programmatically operable mechanism configured to manipulate a structural member, truss member, truss, etc., in at least one of single-direction locomotion, multiple-direction locomotion, rotation about a single axis, and rotation about multiple axes. For the present disclosure, the term robot encompasses mechanisms, ranging inclusively from unidirectional conveyors to 7-axis articulating arms, capable of programmatically moving and/or articulating a structural member, a chord, a plate, a truss, etc., to facilitate transforming individual structural members into building components.

Embodiments disclosed herein relate to plating structural members, such as splicing and/or pre-plating structural members (e.g., boards, dimensional lumber), to be used in building components for structures such as homes or other buildings. Embodiments disclosed herein find particular utility in plating (e.g., splicing and/or pre-plating) truss members to be used in constructing trusses, including floor trusses and roof trusses.

FIG. 1A is a perspective view of a pre-plating system 100 of a plating system, according to some embodiments of the present disclosure. Although designated and described herein as a pre-plating system, the pre-plating system 100 of FIG. 1A can also operate to splice structural members together and could be designed and/or designated specifically to operate as a splicing system. In other words, the system 100 of FIG. 1A can plate in a manner to splice and/or pre-plate, particularly in conjunction with other elements of and operations performed by a plating system. Moreover, a splicing system of a plating system may include features (e.g., press, infeed, outfeed, etc.) and operability (e.g., plate picking, positioning of structural members, centroid locating) similar to the same described with reference to the pre-plating system 100 of FIG. 1A.

The pre-plating system 100 of FIG. 1A includes a plate picking robot 110, a transfer pedestal 114, a press loading robot 126, a press 116, an infeed delivery system 108, an infeed robot 106, an outfeed robot 120, and an outfeed delivery system 122. The plate picking robot 110 is configured to pick, from one of a plurality of containers 124, a plate 112 to be used at a joint between two or more truss members. The containers 124 are configured to store the plates 112. The plate picking robot 110 is configured to place the plate 112 on the transfer pedestal 114. The press loading robot 126 is configured to transfer the plate 112 from the transfer pedestal 114 to a press surface 118 of the press 116. The infeed delivery system 108 is configured to deliver a structural member 102 to the infeed robot 106. The infeed robot 106 is configured to deliver the structural member 102 to the press 116. The outfeed robot 120 is configured to remove the structural member 102 from the press 116. The press 116 is configured to secure the plate to the structural member 102 (e.g., by pressing teeth of the plate into the structural member 102) while the structural member 102 is held in position by either the infeed robot 106 or the outfeed robot 120.

The infeed robot 106 and the outfeed robot 120 are configured to position the structural member 102 within the press 116 based on a determined centroid of the structural member. In some embodiments, the infeed robot 106, the outfeed robot 120, or both, may be a multi-axis articulating arm as shown in FIG. 1A. In some embodiments, a transport (e.g., a conveyor system or intelligent conveyor system, such as the intelligent conveyor system 150 described below with reference to FIG. 1B) may be operable to perform the functions herein described as performed with or by the infeed robot 106, the outfeed robot 120, or both.

The infeed robot 106 and the outfeed robot 120 can position the structural member 102 within the press 116 without the use of an indicia provided on or in the structural member 102. As used herein, the term "centroid" refers to an average position of points in space defining a structural member. In some embodiments, the centroid is determined based on a major plane of a structural member (e.g., an estimate of the average position of the points making up the major plane). A location of the centroid of the structural member 102 may be determined by various methods. For example, it may be known that the structural member 102 has a certain predetermined geometry (e.g., a 2×4, a 2×12, etc.), and that the infeed delivery system 108 will deliver the structural member 102 to a known position and orientation. As a specific example, the structural member 102 may have a known geometry, and the infeed delivery system 108 may be configured to convey a leading edge of the structural member 102 to a pre-determined location, allowing the infeed robot 106 to estimate the location of the centroid relative to itself based on the known geometry and the known position of the leading edge. As another example, image sensors may be used to determine locations of edges and/or corners of the structural member 102, and an estimate of the centroid may be determined based on the determined locations of the edges and/or corners. A further example of determining the location of the centroid includes the use of weight and/or mass measuring devices. Assuming that the truss member is approximately uniformly dense, the centroid may be determined by locating the center of mass of the structural member 102.

In some embodiments, one or more of the infeed robot 106, the outfeed robot 120, the plate picking robot 110, or the press loading robot 126 may include robot arm assemblies having securing mechanisms at their ends and one or more joints. The securing mechanisms (e.g., end of arm tool) at the ends of the infeed robot 106 and the outfeed robot 120 are configured to secure the structural member 102. By way of non-limiting example, the securing mechanisms at the ends of the infeed robot 106 and the outfeed robot 120 may include a suction mechanism (e.g., a vacuum system) configured to secure the structural member 102 thereto using suction. Also, by way of non-limiting example, the securing mechanisms at the ends of the infeed robot 106 and the outfeed robot 120 may include a gripping mechanism (e.g., a claw) to grip the structural member 102. As a further non-limiting example, the securing mechanisms at the ends of the infeed robot 106 and the outfeed robot 120 may include puncturing mechanisms configured to pierce the structural member 102. In some embodiments the infeed robot 106 and the outfeed robot 120 may include both a suction mechanism and a gripping mechanism at the end thereof. In some such embodiments the suction mechanism may be used to secure structural members that are longer than a predetermined threshold length (e.g., four feet), and the gripping mechanism may be used to grip structural members that are shorter than the predetermined threshold length.

The securing mechanisms at the ends of the plate picking robot 110 and the press loading robot 126 are configured to secure the plates 112. By way of non-limiting example, the securing mechanisms (e.g., end of arm tools) at the ends of the plate picking robot 110 and the press loading robot 126 may include a magnet (e.g., a passive magnet and/or an electromagnet) to secure plates 112 including magnetically attractive materials (e.g., iron, nickel, etc.). Magnets may also be used at the transfer pedestal 114 and/or the press 116 to secure the plates thereto. In instances where handoffs of the plate between devices having passive magnets occur, a device handing off the plate to a subsequent device may roll away from the plate rather than back straight off the plate to facilitate detachment from the plate without interrupting the coupling between the plate and the subsequent device. Another approach may be to use weaker magnets in devices than stronger magnets used in a subsequent device (e.g., magnets of the plate picking robot 110, the transfer pedestal 114, the press loading robot 126, and the press 116 have successively stronger magnets to facilitate handoffs between devices). In instances where electromagnets are used, the electromagnets may be controlled to facilitate handoffs between the various devices. For example, the plate picking robot 110 may maintain current flowing through an electromagnet at the end thereof to secure the plate to the end of the plate picking robot 110, then interrupt the current flowing therethrough while initiating a current to an electromagnet of the transfer pedestal 114. Also, by way of non-limiting example, the securing mechanisms at the ends of the plate picking robot 110 and the press loading robot 126 may include gripping members to grip the plates 112.

In some embodiments the securing mechanisms at the ends of the plate picking robot 110 and the press loading robot 126 may include a gripping mechanism. The gripping mechanism may be configured to grip the plate regardless of the pattern of teeth/holes on the plate.

The one or more joints of the infeed robot 106, the outfeed robot 120, the plate picking robot 110, and the press loading robot 126 are configured to enable the infeed robot 106, the outfeed robot 120, the plate picking robot 110, and the press loading robot 126 with motion capabilities (e.g., translational motion, rotary motion). These joints may include linear joints, orthogonal joints, rotational joints, twisting joints, revolving joints, or combinations thereof. In the embodiment illustrated in FIG. 1A the plate picking robot 110 is mounted on a trolley 130 that traverses a track 132 that extends between multi-tiered container racks 128 loaded with containers 124 filled with plates 112 of various shapes and/or sizes. The containers 124 are located within reach of the plate picking robot 110 to enable the plate picking robot 110 to retrieve plates 112 from the containers 124. The joints of the plate picking robot 110 enable the plate picking robot 110 to reach plates 112 located within any of the containers 124. The plates 112 may be organized into specific locations within the container racks 128 and containers 124 so that the plate picking robot 110 can traverse the track to the location of a certain one of the containers 124 and pick the proper plate therefrom. The plate picking robot 110 then, if needed, traverses the track 132 to within reach of the transfer pedestal 114 and places the plate on the transfer pedestal 114. The plates 112 may be organized by size and/or shape within the containers 124 so that the plate picking robot 110 can retrieve a plate 112 of a desired shape and/or size from a known location.

In some embodiments the plate picking robot 110 is configured to rotate a retrieved plate 112 to a desired orientation before placing the plate 112 on the transfer pedestal 114. The desired rotation may be based on a desired orientation at which the plate 112 is to be pressed into a structural member by the press 116 to pre-plate the structural member at a joint of the structural component to be constructed. Accordingly, it may be desirable to secure the plate 112 with the securing mechanism at the end of the plate picking robot 110 at a center of the plate 112 to enable balanced rotation of the plate 112. A center of the plate 112 may be located based on known geometries of the plate 112 and the containers 124 that hold the plates 112, and known positions of the containers 124 relative to the plate picking robot 110. With the plate 112 placed on the transfer pedestal 114 at a desired angle, the press loading robot 126 can transfer the plate 112 from the transfer pedestal 114 to the press 116 absent undue rotation (or potentially without any rotation). It should be noted that in some embodiments the transfer pedestal 114 may be used to rotate the plate 112 to the desired angle instead of, or in addition to, the plate picking robot 110.

The joints of the press loading robot 126 enable the securing mechanism at the end of the press loading robot 126 to extend between the transfer pedestal 114 and the press surface 118 of the press 116. As noted, the press loading robot 126 may be configured to transfer a plate 112 from a working surface 104 of the transfer pedestal 114 to the press surface 118. The transfer may be configured to be performed without rotation (and/or absent rotation of the securing mechanism relative to an end of the press loading robot 126) so as to maintain a previously determined desired orientation of the plate 112.

The joints of the infeed robot 106 enable the securing mechanism at the end of the infeed robot 106 to extend between the infeed delivery system 108 and the press 116. These joints may also enable the infeed robot 106 to position the structural member 102 in various different positions within the press 116 to enable plates 112 to be applied to various locations on the structural member 102. By way of non-limiting example, the infeed robot 106 may be configured to rotate the structural member 102 about a centroid of the member, such as about a transverse axis of the structural member. By way of another non-limiting example, the infeed robot 106 may be configured to rotate the structural member 102 about a longitudinal axis of the structural member 102 to facilitate application of a plate 112 to a particular side of the structural member 102.

Similarly, the joints of the outfeed robot 120 enable the securing mechanism at the end of the outfeed robot 120 to extend between the press 116 and the outfeed delivery system 122. These joints may also enable the outfeed robot 120 to position the structural member 102 in various different positions (and may include rotation about a longitudinal axis of the structural member 102) within the press 116 to enable plates 112 to be applied to various locations on the structural member 102.

The press 116 may be a hydraulic press. The press 116 may include an electrically controllable press. As previously discussed, in some embodiments the press 116 may include a magnet 119 (e.g., an electromagnet) configured to selectively secure a plate 112 to the press surface 118 in a position and orientation in which the press loading robot 126 delivered the plate 112 thereto. The press 116 is configured to apply enough force to a plate 112 mounted thereto into the structural member 102.

In some embodiments the transfer pedestal 114 includes a working surface 104. In the embodiment illustrated in FIG. 1A, the working surface 104 of the transfer pedestal 114 is at a slant rather than being oriented horizontally. The working surface 104, however, may have any orientation including horizontal, vertical, or any non-horizontal and/or non-vertical slopes. In some embodiments, the transfer pedestal 114 may include a magnet 115 (e.g., an electromagnet that is selectively controllable) to enable a plate 112 to be secured thereto. As previously discussed, orientation of the plate in anticipation of placing the plate 112 at a particular orientation on the structural member 102 may be performed at least in part by the plate picking robot 110 orienting the plate 112 in a specific way on the working surface 104 of the transfer pedestal 114.

In some embodiments the infeed delivery system 108 may include a conveyor system, such as that illustrated in FIG. 1A. In some embodiments, the conveyor system may be tilted at a non-horizontal slope to present the structural member 102 to the infeed robot 106 in a convenient orientation for the infeed robot 106 to secure the structural member 102. In other words, it may be convenient for the infeed robot 106 to secure the structural member 102 if it approaches the infeed robot 106 at a non-horizontal angle. In some embodiments, however, the conveyor system may be oriented horizontally. In some embodiments, the infeed delivery system 108 may comprise an intelligent conveyor system, such as the intelligent conveyor system 150 described in FIG. 1B, whereby the infeed delivery system 108 is configured to perform the functions herein described in conjunction with the infeed robot 106.

In some embodiments the outfeed delivery system 122 includes one or more trolleys 134 that traverse one or more tracks 136. The trolleys 134 may be configured to secure the pre-plated structural member 102 thereto and move along the tracks 136 to carry the structural member 102 away from the pre-plating system 100. By way of non-limiting example, the trolleys 134 may include electromagnets configured to secure to one or more metal plates 112 pressed into the structural member 102. Also, by way of non-limiting example, the trolleys 134 may include suction mechanisms to enable the trolleys 134 to secure to the structural member 102 using suction. In some embodiments the outfeed delivery system 122 is configured to deliver the structural member 102 to a truss assembly system (e.g., an automatic truss assembly system) where the structural member 102 will be used along with other truss members to build a truss. In some embodiments, the outfeed delivery system 122 may comprise an intelligent conveyor system, such as the intelligent conveyor system 150 described in FIG. 1B, whereby the outfeed delivery system 122 is configured to perform the functions herein described in conjunction with the trolleys 134 and tracks 136 (and/or the outfeed robot 106).

The structural member 102 may be a chord of a truss, a vertical member of a truss, a diagonal member of a truss, etc. The structural member may be a wooden board (e.g., to be assembled together with another wooden board to construct the building component), a composite material, or another suitable material for being plated together and/or for erecting structures.

The area within the circle B of FIG. 1A is an area illustrated in greater detail in FIG. 1B (albeit another embodiment) and is discussed below.

Figure 1B:
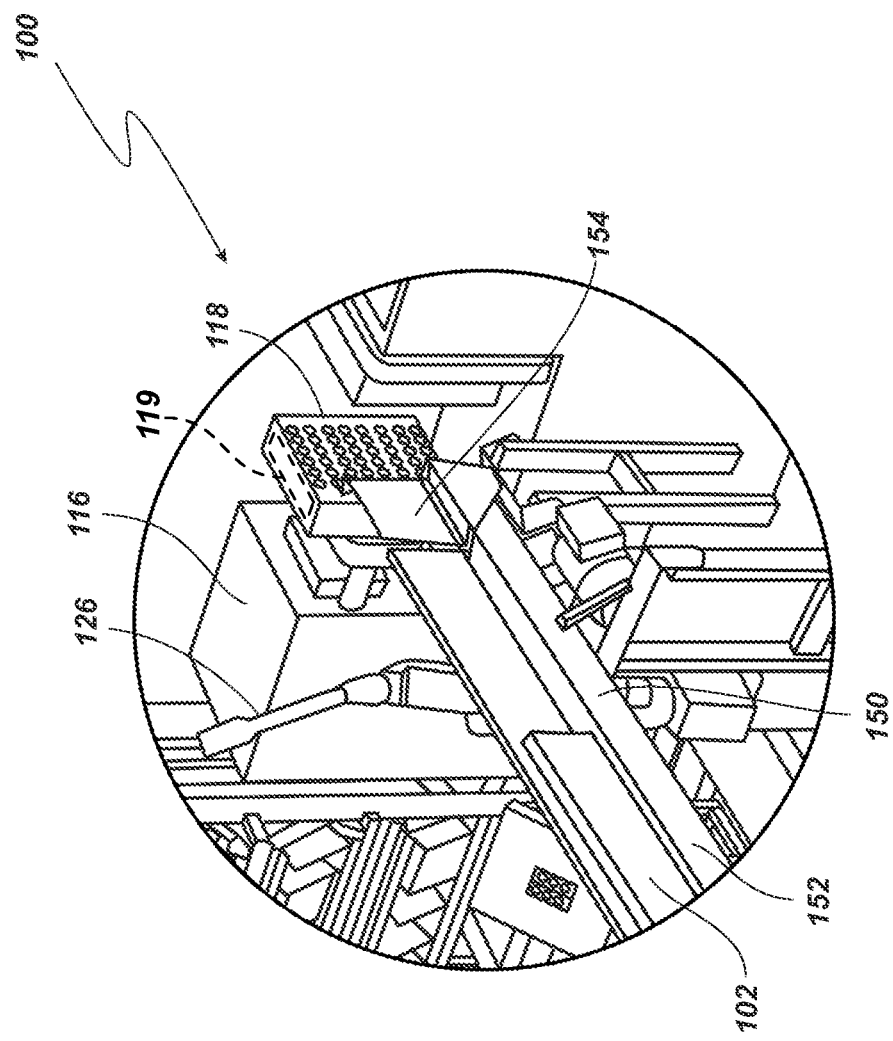
FIG. 1B is a detailed view of a portion of a pre-plating system, according to an embodiment, having an intelligent conveyor system.

FIG. 1B is a detailed view of a portion of another embodiment of a pre-plating system (similar to the pre-plating system 100 of FIG. 1A), according to an embodiment, and having an intelligent conveyor system 150. The press 116, press surface 118, and press loading robot 126 are shown for reference. While FIG. 1A illustrates an infeed robot 106 distinct from the infeed delivery system 108, in some embodiments the infeed delivery system 108 may comprise a robot that is a programmatically operable conveyor system ("intelligent conveyor system") 150 functioning as one of or both the infeed delivery system 108 and the infeed robot 106. The intelligent conveyor system 150 may comprise a transport unit 152 configured to advance the structural member 102 toward the press 116. For example, the intelligent conveyor system 150 may comprise an optical or mechanical sensor configured to identify one or more portions (e.g., leading edge, side edge, centroid) of the structural member 102 whereby the intelligent conveyor system 150 may programmatically advance the structural member 102, stop advancing the structural member 102 to align a particular portion of the structural member 102 with the press surface 118, and may repeatedly advance and stop the structural member 102. The intelligent conveyor system 150 may be configured with a clamping mechanism 154 whereby the structural member 102 may be secured in a desired position. For example, based on input from the optical or mechanical sensor, the intelligent conveyor system 150 may advance the structural member 102 to dispose a particular portion of the structural member 102 at the press surface 118 of the press 116, and may, by means of the clamping mechanism 154, secure the structural member 102 as the press 116 applies a plate (see the plate 112 in FIG. 1A) to the structural member 102 as herein described. Furthermore, the clamping mechanism 154 may be configured to rotate the structural member 102 about a longitudinal axis of the structural member 102 to permit plating to a particular side of the structural member 102. In some embodiments, the intelligent conveyor system 150 may comprise a separate mechanism (not shown) to facilitate rotation of the structural member 102 about its longitudinal axis.

In some embodiments, the outfeed delivery system may comprise a similar intelligent conveyor system in lieu of the outfeed robot (see the outfeed delivery system 122 and outfeed robot 120 in FIG. 1A) and in addition to the intelligent conveyor system 150. An outfeed intelligent conveyor system may be configured similar to the intelligent conveyor system 150, may comprise a similar clamping mechanism, and may similarly programmatically (and repeatedly) advance and stop the structural member 102 as the structural member 102 exits the press 116. The outfeed intelligent conveyor system may be further configured to rotate the structural member 102 about a longitudinal axis of the structural member 102. In some embodiments, the intelligent conveyor system 150 may comprise the infeed delivery system 108, the outfeed delivery system 122, and the programmatic functions of the infeed robot 106 and the outfeed robot 120. In the present disclosure, "robot" may refer to a particularly named robot (e.g., infeed robot 106, outfeed robot 120), and may also refer to an element of the pre-plating system 100 performing the functions of the named robot (e.g., intelligent conveyor system 150 performing a function of the infeed robot 106).

Figure 2:
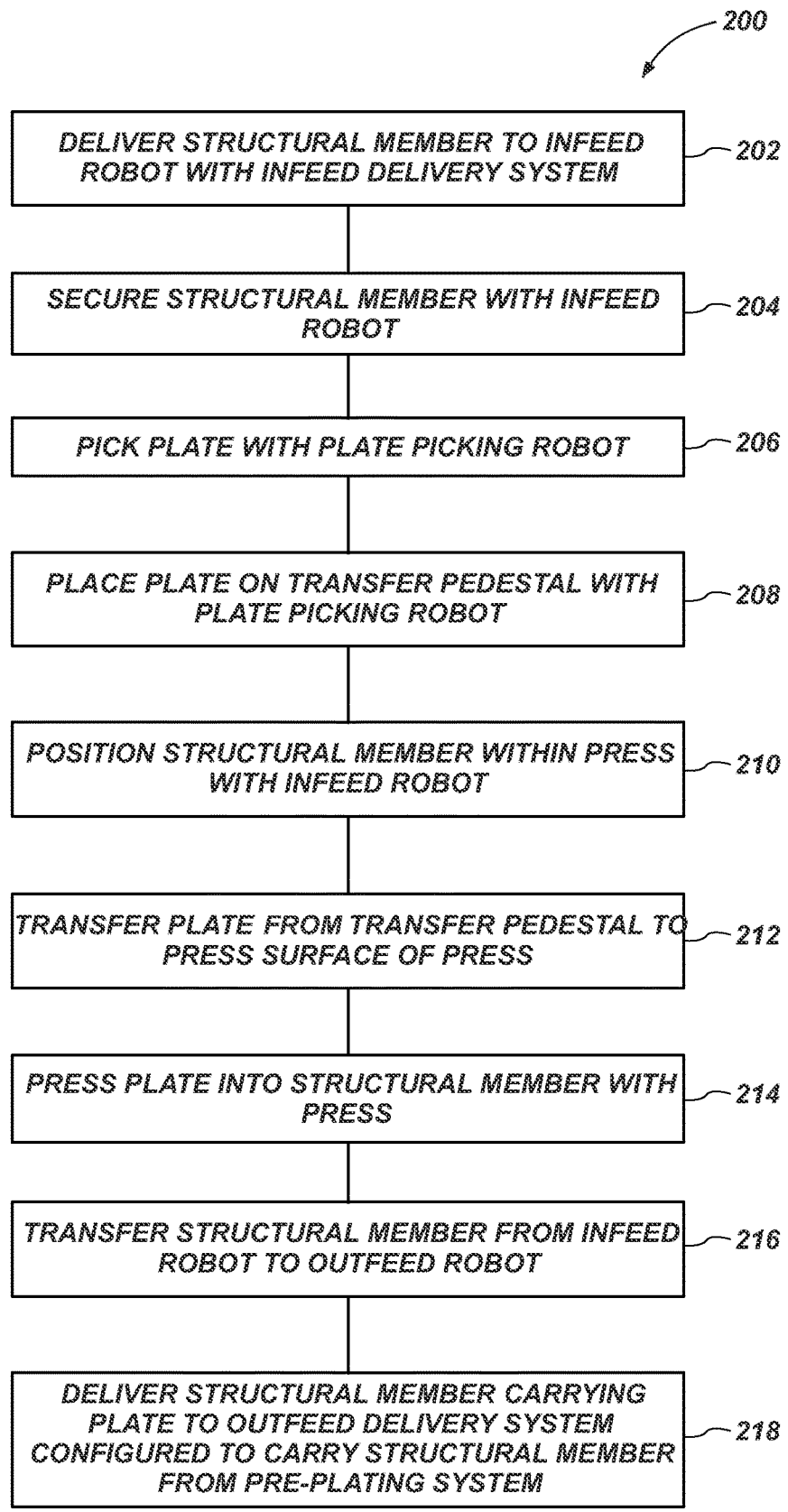
FIG. 2 is a flowchart illustrating a method of operation of a pre-plating system, according to one embodiment of the present disclosure.
Figure 5:
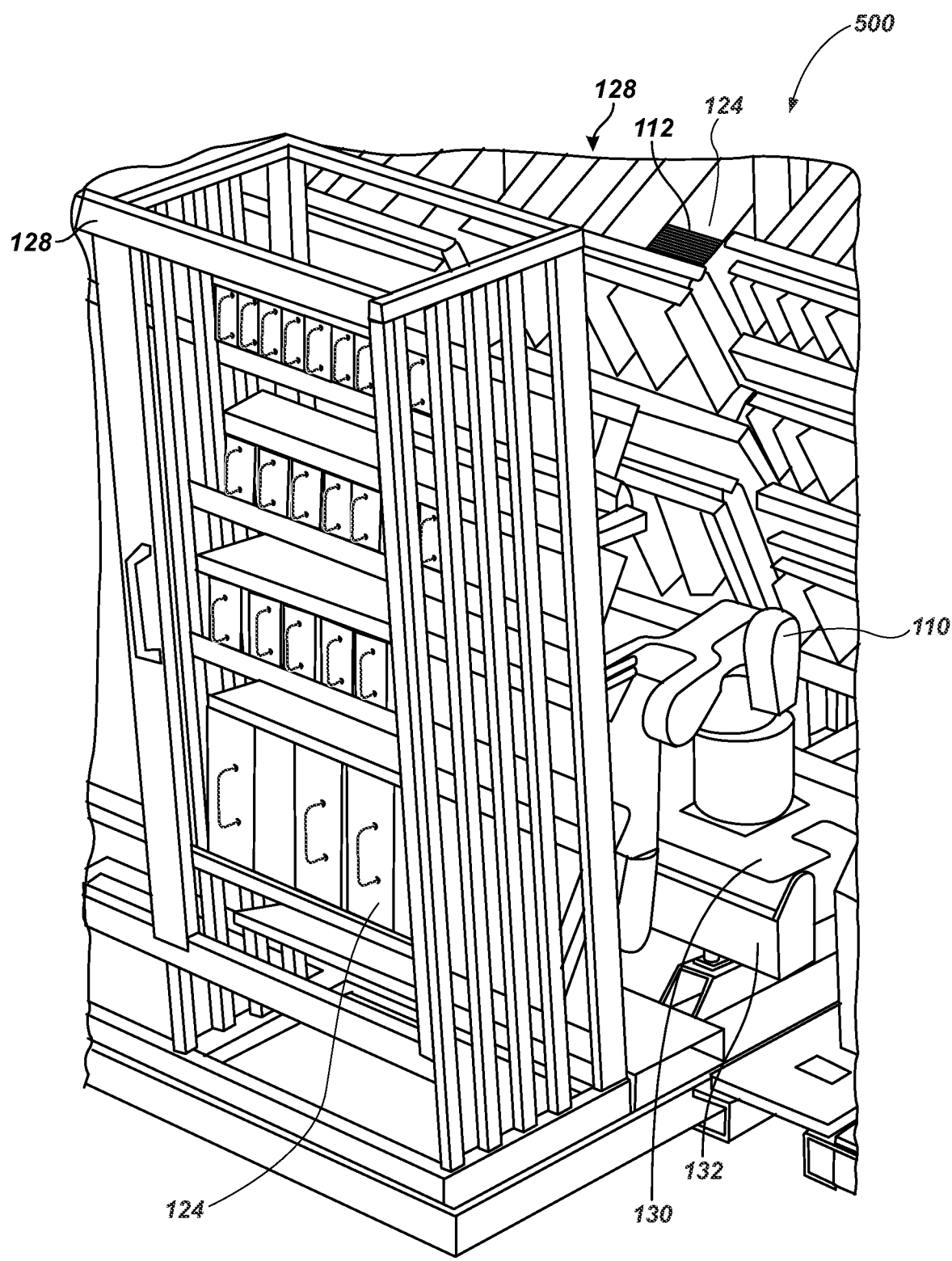
FIG. 5 is a perspective view of a portion of the pre-plating system picking a plate.
Figure 6:
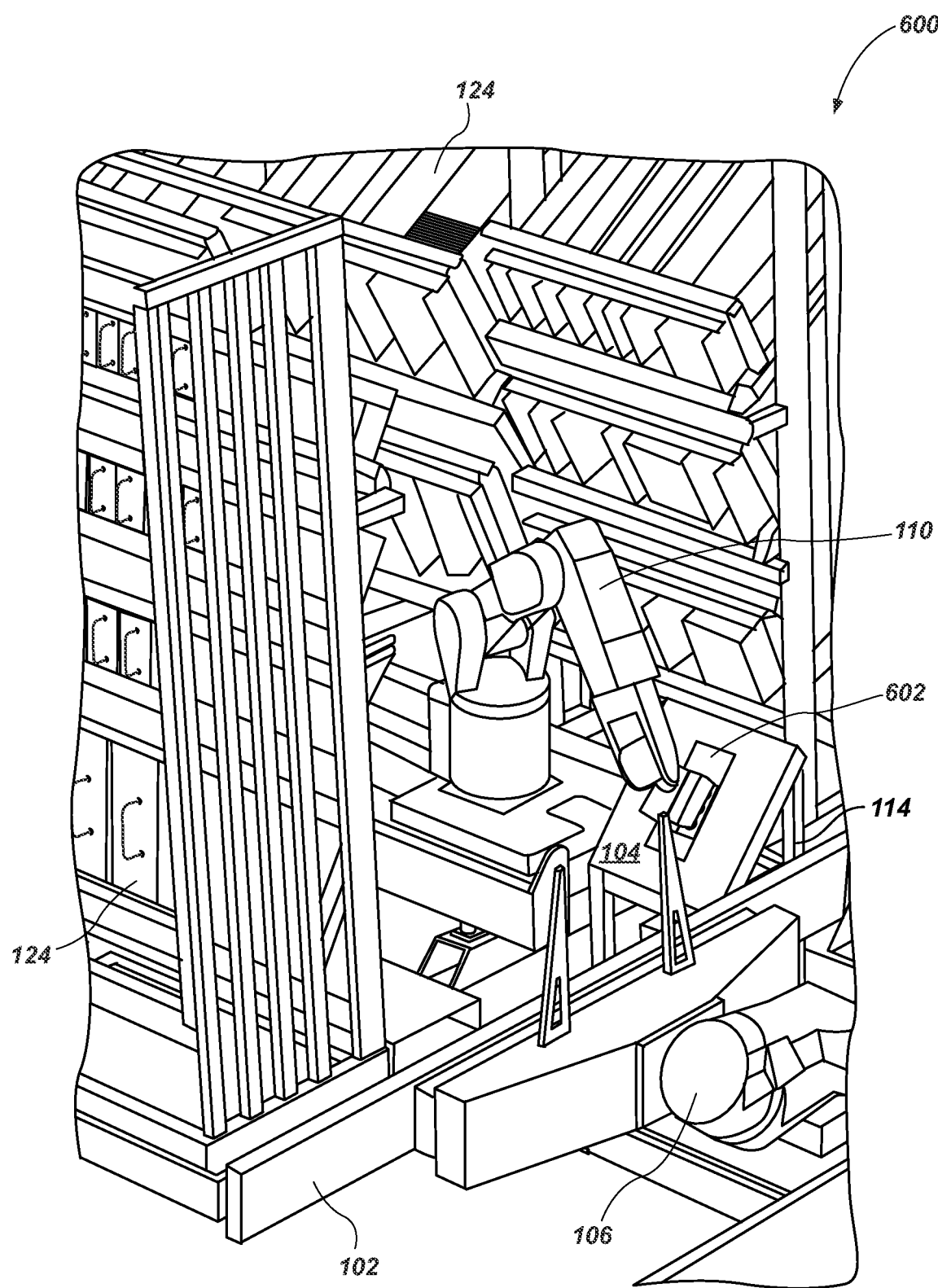
FIG. 6 is a perspective view of a portion of the pre-plating system placing a plate on a transfer pedestal.

FIG. 2 is a flowchart illustrating a method 200 of operating the pre-plating system 100 of FIG. 1A, according to some embodiments. FIGS. 3, 4, and 7-14 are perspective views of the pre-plating system 100 of FIG. 1A, illustrating various actions (or operations) 202, 204, and 210-218 of the method 200 of FIG. 2. FIGS. 5 and 6 are perspective views of portions 500, 600, respectively, of the pre-plating system 100 of FIG. 2, illustrating other actions (or operations) 206, 208 of the method 200 of FIG. 2.

Figure 3:
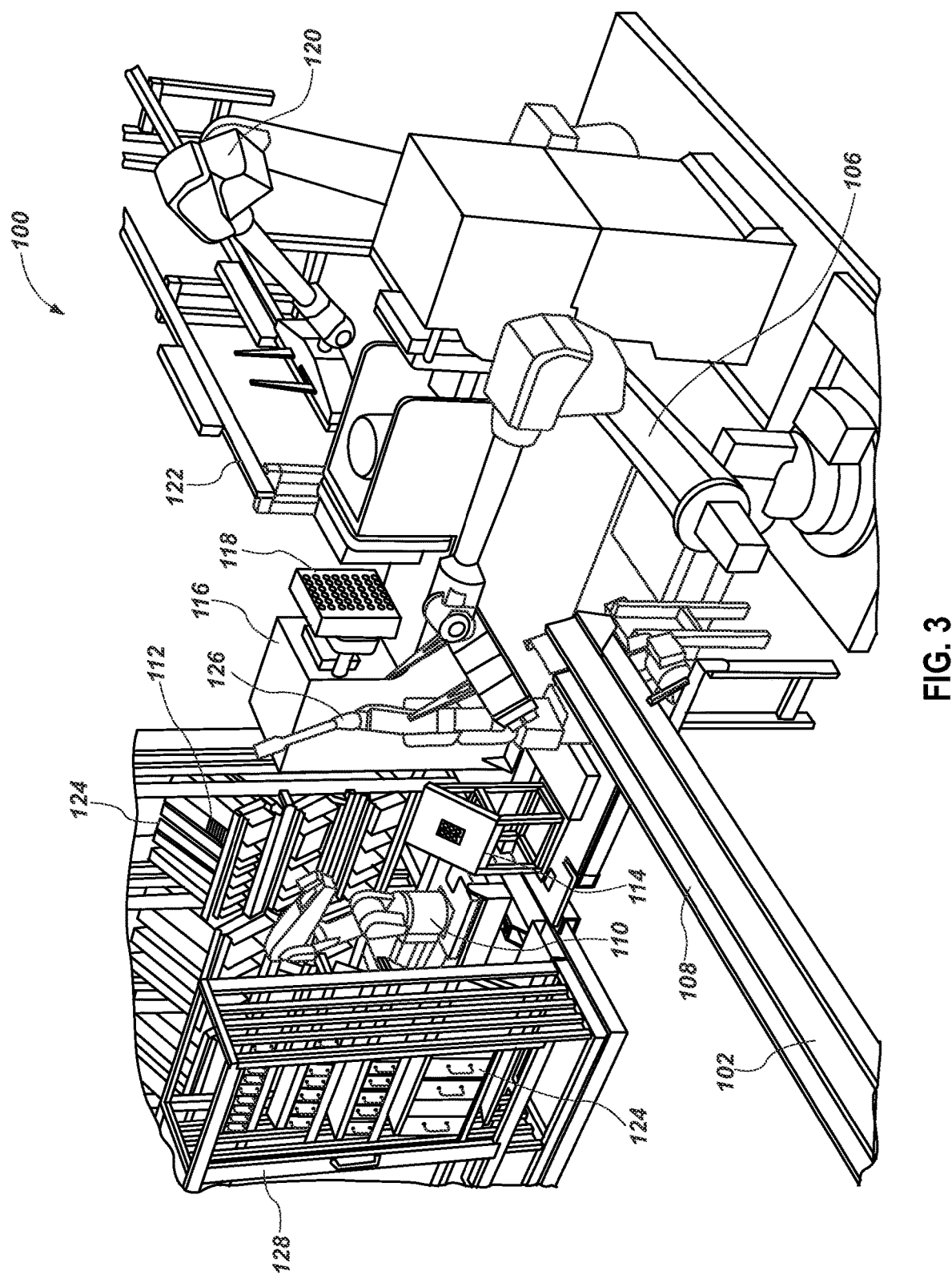
FIG. 3 is a perspective view of the pre-plating system delivering a structural member to an infeed robot.

Referring to FIGS. 2 and 3 together, the method 200 includes delivering 202 the structural member 102 to the infeed robot 106 with the infeed delivery system 108. In some embodiments delivering 202 the structural member 102 to the infeed robot 106 includes conveying the structural member 102 to the infeed robot 106 using a conveyor system. In some embodiments delivering 202 the structural member 102 to the infeed robot 106 includes delivering the structural member 102 to the infeed robot 106 with a major plane of the structural member 102 oriented in a tilted, non-horizontal angle to enable the infeed robot 106 to conveniently secure the structural member 102.

Figure 4:
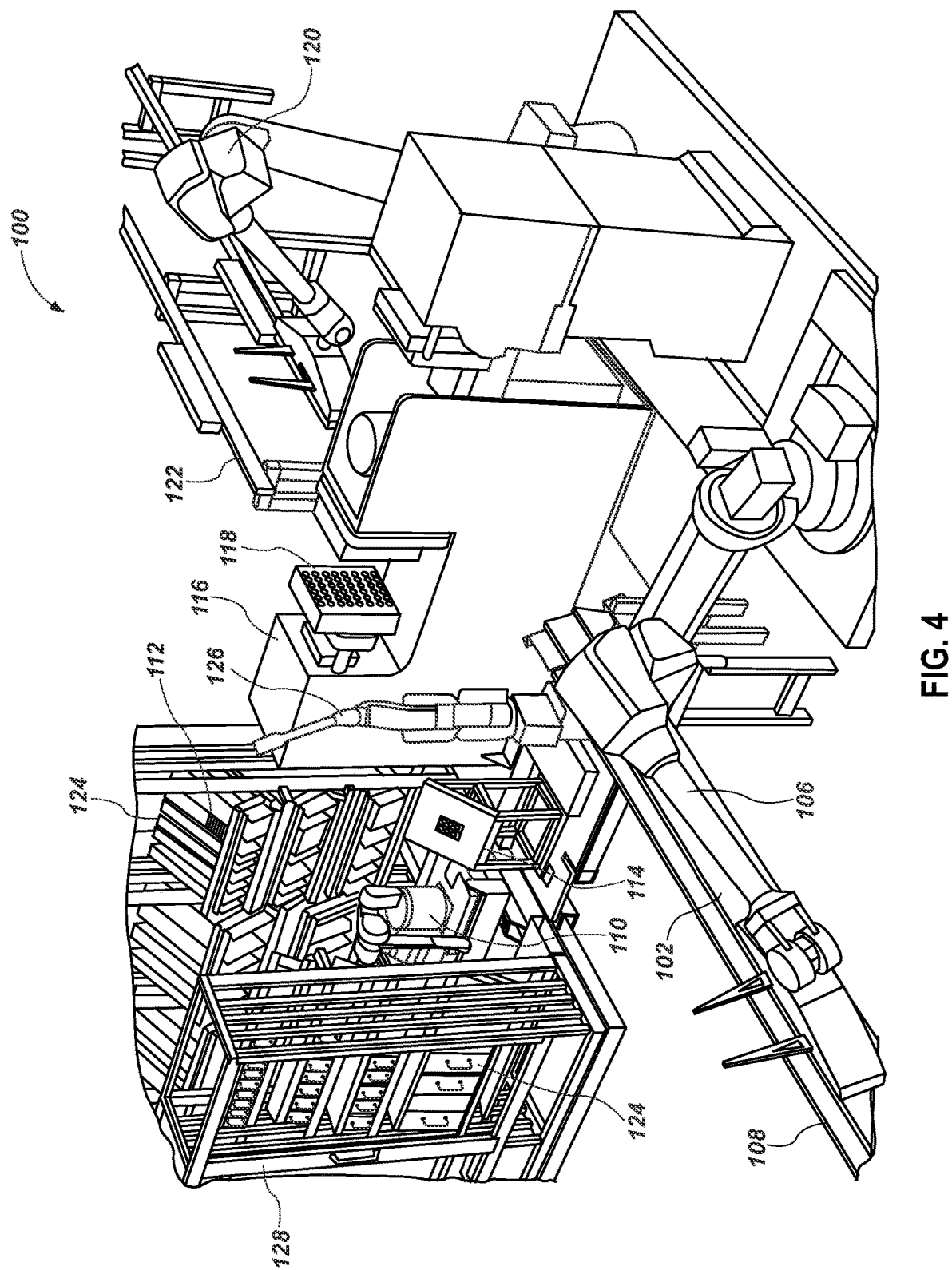
FIG. 4 is a perspective view of the pre-plating securing a truss member with the infeed robot.

Referring now to FIGS. 2 and 4, the method 200 also includes securing 204 the structural member 102 with the infeed robot 106. FIG. 4 illustrates the infeed robot 106 securing 204 the structural member 102 with the securing mechanism at the end of the infeed robot 106. In some embodiments, securing the structural member 102 with the infeed robot 106 includes suctioning the structural member to the infeed robot 106 with a vacuum system. In some embodiments, securing the structural member 102 to the infeed robot 106 includes gripping the structural member 102 with a gripping member at the end of the infeed robot 106.

FIG. 5 is a perspective view of a portion 500 of the pre-plating system 100 of FIG. 1A. Referring to FIGS. 2 and 5 together, the method 200 further includes picking 206 a plate 112 from one of the containers 124 with the plate picking robot 110. FIG. 5 shows the plate picking robot 110 picking 206 a plate 112 from one of the containers 124. In the embodiment illustrated in FIG. 5 the plate picking robot 110 is mounted on a trolley 130 that traverses a track 132 that extends between multi-tiered container racks 128 loaded with containers 124 filled with plates 112 of various shapes and/or sizes. The containers 124 are located within reach of the plate picking robot 110 to enable the plate picking robot 110 to retrieve plates 112 from the containers 124. The plate picking robot 110 may comprise an arm that can move about multiple axes to enable the plate picking robot 110 to reach plates 112 located within any of the containers 124. The plates 112 may be organized into specific locations within the container racks 128 and containers 124 so that the plate picking robot 110 can traverse the track 132 to the location of a certain one of the containers 124 and pick the proper plate 112 therefrom. The plate picking robot 110 then, if needed, traverses the track 132 to within reach of the transfer pedestal 114 and places the plate 112 on the transfer pedestal 114. The plates 112 may be organized by size and/or shape within the containers 124 so that the plate picking robot 110 can retrieve a plate 112 of a desired shape and/or size from a known location.

In another embodiment, plates 112 may be provided on a spool. The spool form may provide plate storage in an alternative form to plate containers 124. The plate picking robot 110 can retrieve a plate of a desired shape and/or size from a spool at a known location. The plate picking robot 110 may be equipped to cut the plate from the spool or to otherwise pick the plate from the spool.

In some embodiments, picking 206 a plate 112 includes securing a center of the plate 112 to an end of the plate picking robot 110. In some embodiments, picking 206 a plate 112 includes securing the plate 112 to the end of the plate picking robot 110 with a gripping mechanism. In some embodiments, picking 206 a plate 112 includes securing the plate 112 to the end of the plate picking robot 110 with a magnet (e.g., a passive magnet, an electromagnet, or both).

FIG. 6 is a perspective view of a portion 600 of the pre-plating system 100 of FIG. 1A. Referring now to FIGS. 2 and 6 together, the method 200 also includes placing 208 a plate 602 on the transfer pedestal 114 with the plate picking robot 110. FIG. 6 shows the plate picking robot 110 placing 208 the plate 602 on a working surface 104 of the transfer pedestal 114. In some embodiments, placing 208 a plate 602 on the transfer pedestal 114 comprises rotating the plate 602 to a desired orientation using the plate picking robot 110 and placing the plate 602 on the transfer pedestal 114 in the desired orientation.

Figure 7:
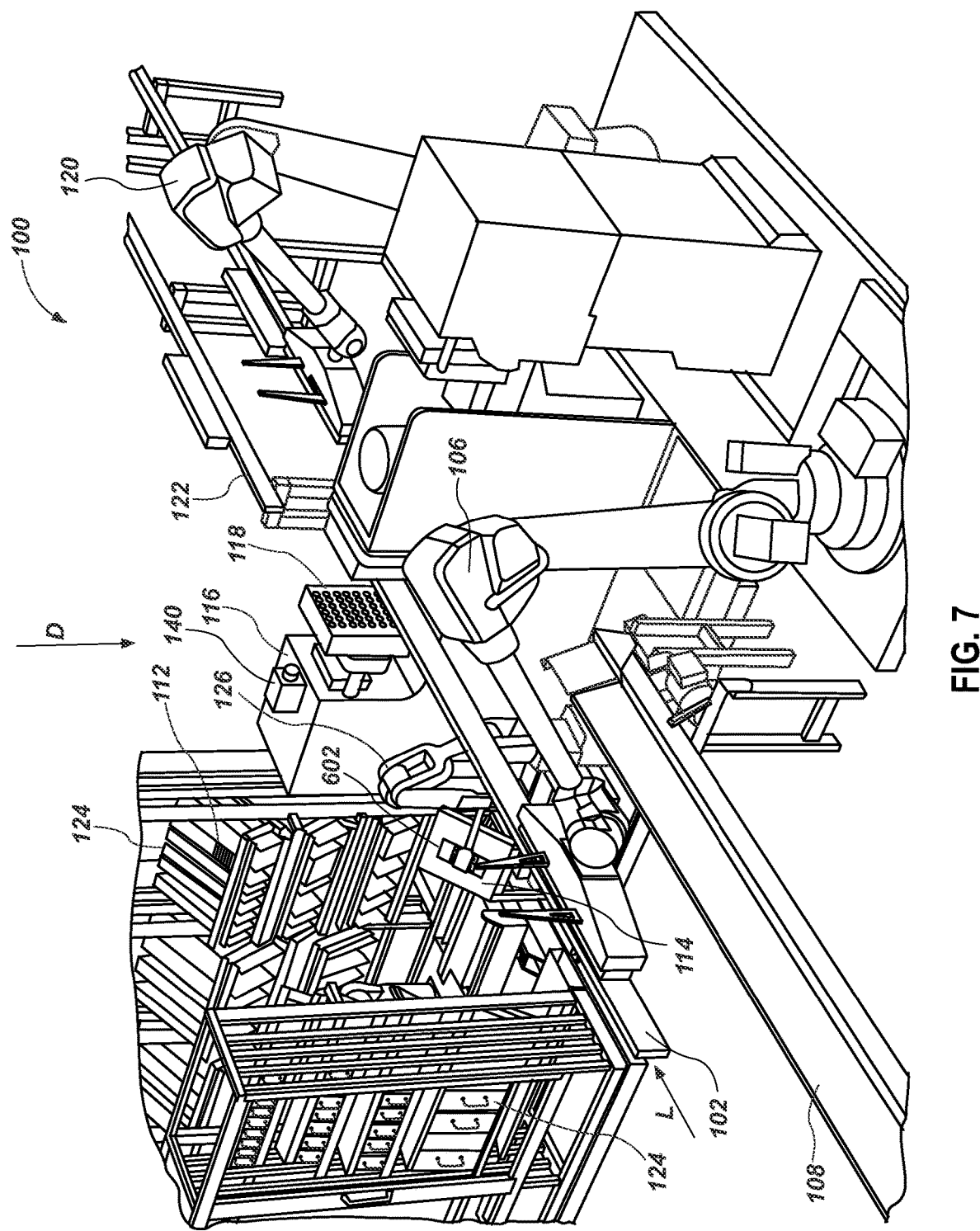
FIG. 7 is a perspective view of the pre-plating system positioning a structural member within a press.

Referring now to FIGS. 2 and 7, the method 200 further includes positioning 210 the structural member 102 within the press 116 with the infeed robot 106. FIG. 7 illustrates the infeed robot 106 positioning 210 the structural member 102 within the press 116. In some embodiments, positioning 210 the structural member 102 within the press 116 includes positioning the structural member 102 within the press 116 based on a determined centroid of the structural member 102. In some embodiments, positioning 210 the structural member 102 within the press 116 includes positioning the structural member within the press 116 without the use of an indicia provided on or in the structural member 102.

In some embodiments, the positioning 210 of the structural member 102 within the press 116 may be accomplished by approaching the press from above and gradually lowering the structural member 102 downward into the press 116 to be engaged by the press surface. Stated otherwise, the structural member 102 can be lowered in a downward direction D (indicated in FIG. 7 by arrow D) that is transverse to the length of the structural member 102 as shown in FIG. 7 and toward the floor.

In some embodiments, positioning the structural member 102 may be accomplished by the infeed robot 106, or the outfeed robot 120. In some embodiments, positioning the structural member 102 may be accomplished by elevating a portion of a transport unit of an intelligent conveyor system, advancing the structural member 102 to an appropriate position (which may also comprise clamping the structural member 102) and de-elevating the portion of the transport unit (see transport unit 152 and intelligent conveyor system 150 in FIG. 1B).

In some embodiments, a vision system 140 may scan the structural member 102 at positioning 210 into the press 116. For example, the vision system 140 may scan the structural member 102 as it is lowered in the downward direction D (or otherwise inserted or placed) into the press 116. As another example, the infeed robot 106 may bring the structural member 102 to a fixed position in front of the vision system 140 for scanning prior to placement of the structural member 102 into the press 116. The vision system 140 can identify a bottom or lowest edge of the structural member 102, which can be used as a reference for appropriately positioning the structural member 102 in the press 116. The vision system 140 can identify a bottom edge of the structural member 102 and detect droop or sag in the robotic arm and/or inject the location of the bottom edge as an input into the infeed robot 106 (and/or the outfeed robot 120) to enhance or otherwise improve preciseness of positioning of the structural member 102 in the press 116. A backdrop may also be provided in the field of view of the vision system 140 and behind the structural member 102 to facilitate capture of image data by the vision system 140.

In other embodiments, the positioning 210 of the structural member 102 within the press 116 may be accomplished by approaching the press from a side or in a lateral direction L (indicated in FIG. 7 by arrow L). In still other embodiment, insertion of the structural member 102 into the press 116 may be approached from another direction, such as a combination of a lateral direction L and a downward direction D.

Figure 8:
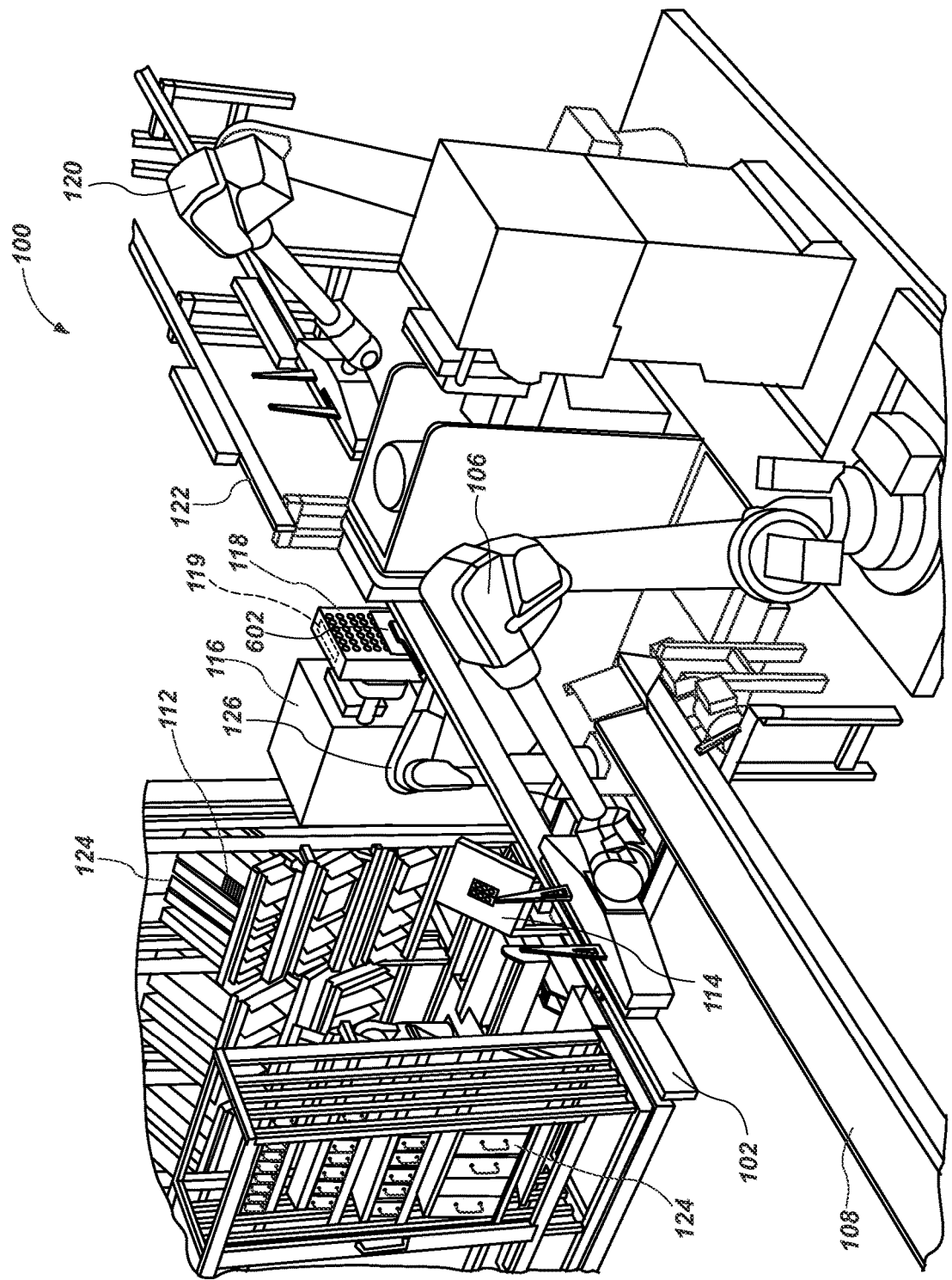
FIG. 8 is a perspective view of the pre-plating system transferring a plate to the press.

Referring now to FIGS. 2 and 8 together, the method 200 includes transferring 212 the plate 602 from the transfer pedestal 114 to a press surface 118 of the press 116. FIG. 8 illustrates the press loading robot 126 placing the plate 602 on the press surface 118 of the press 116. In some embodiments, transferring 212 the plate 602 from the transfer pedestal 114 to a press surface 118 of the press 116 includes securing the plate 602 on the press surface 118 while at least one of the infeed robot 106, the outfeed robot 120, and the intelligent conveyor system (see the intelligent conveyor system 150 in FIG. 1B) positions the structural member 102 within the press 116. In some embodiments, transferring 212 the plate 602 from the transfer pedestal 114 to a press surface 118 of the press 116 includes securing the plate on the press surface 118 using a securement mechanism 119, such as a magnet (e.g., a passive magnet, an electromagnet, or both), a vacuum, a mechanical gripper, or the like. The securement mechanism 119 may be internal to and/or otherwise integrated with the press surface 118 of the press 116.

Figure 9:
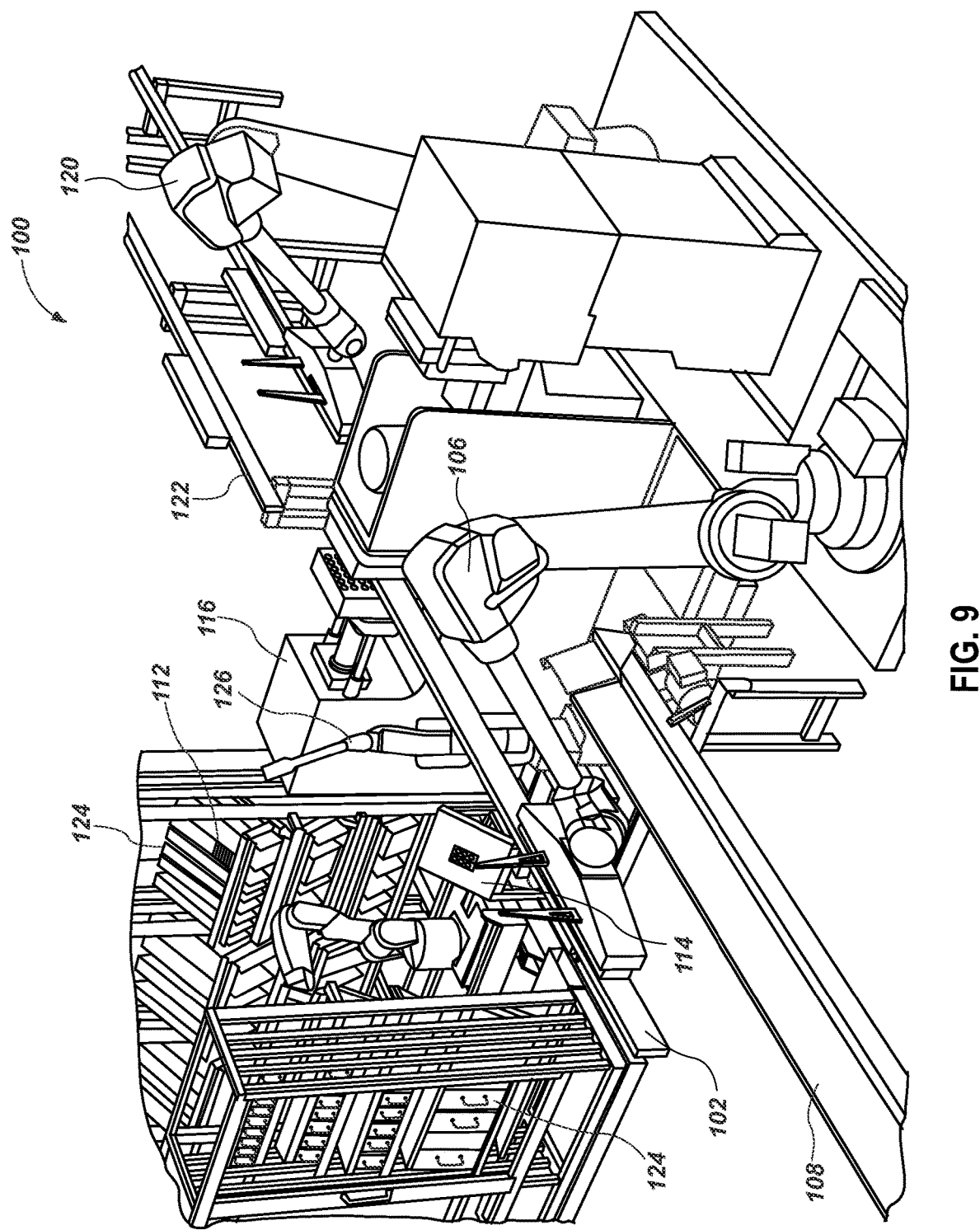
FIG. 9 is a perspective view of the pre-plating system pressing the plate into the structural member.

Referring to FIGS. 2 and 9, the method 200 includes pressing 214 the plate 602 into the structural member 102 with the press 116. FIG. 9 illustrates the press 116 pressing 214 the plate 602 into the structural member 102.

Figure 10:
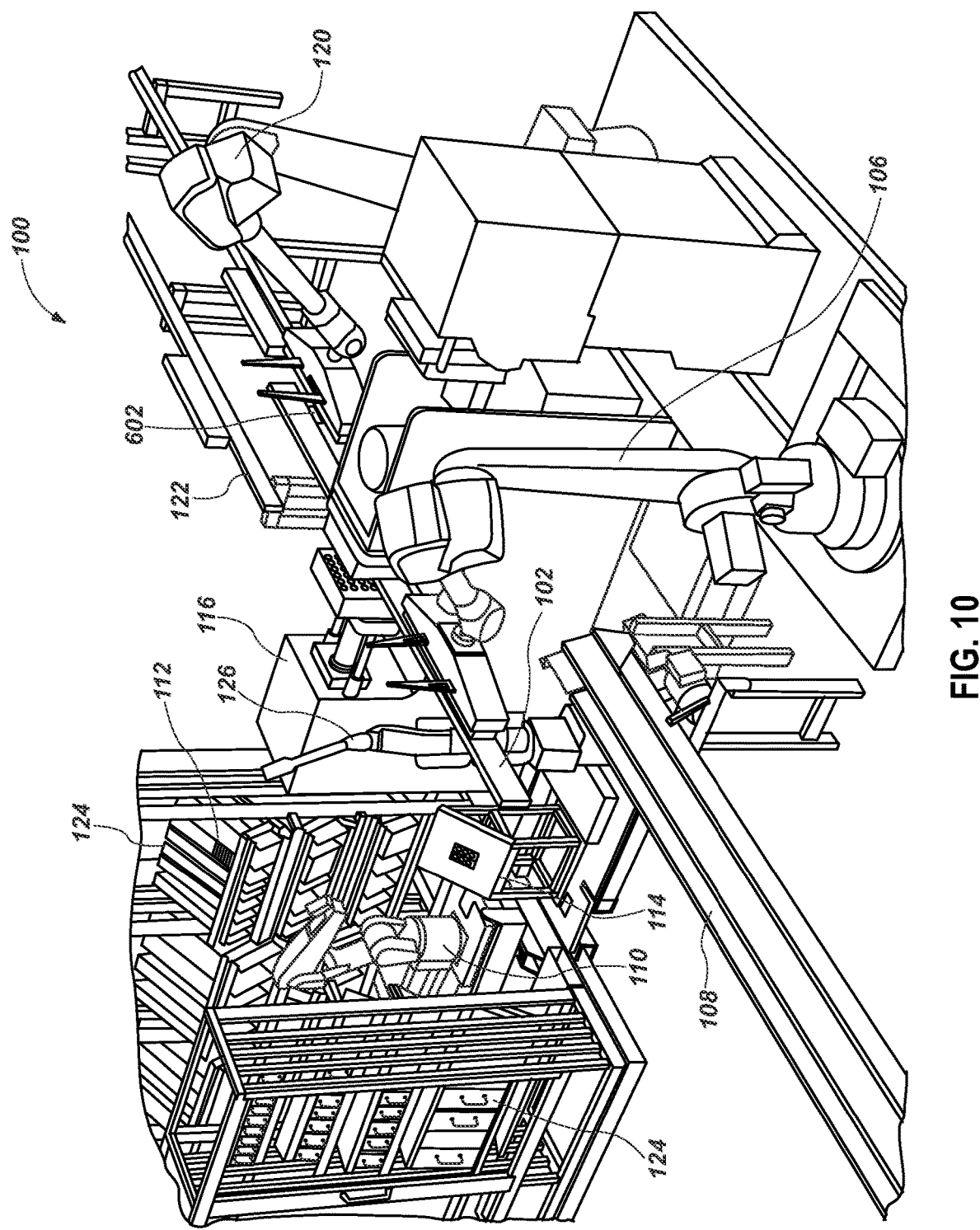
FIG. 10 is a perspective view of the pre-plating system pressing another plate into the structural member at a different location from the plate.

Referring now to FIGS. 2 and 10 together, in some embodiments, positioning 210 and pressing 214 comprises repositioning the structural member 102 within the press 116 and pressing another plate into the structural member 102 at a different location than that of the plate 602. FIG. 10 illustrates the infeed robot 106 holding the structural member 102 in another position and the press 116 pressing another plate into the structural member 102 at a different location from that of the plate 602. Similarly, the intelligent conveyor system may repeatedly advance and stop (and may clamp/unclamp) the structural member 102 to permit application of one or more additional plates to the structural member 102.

Figure 11:
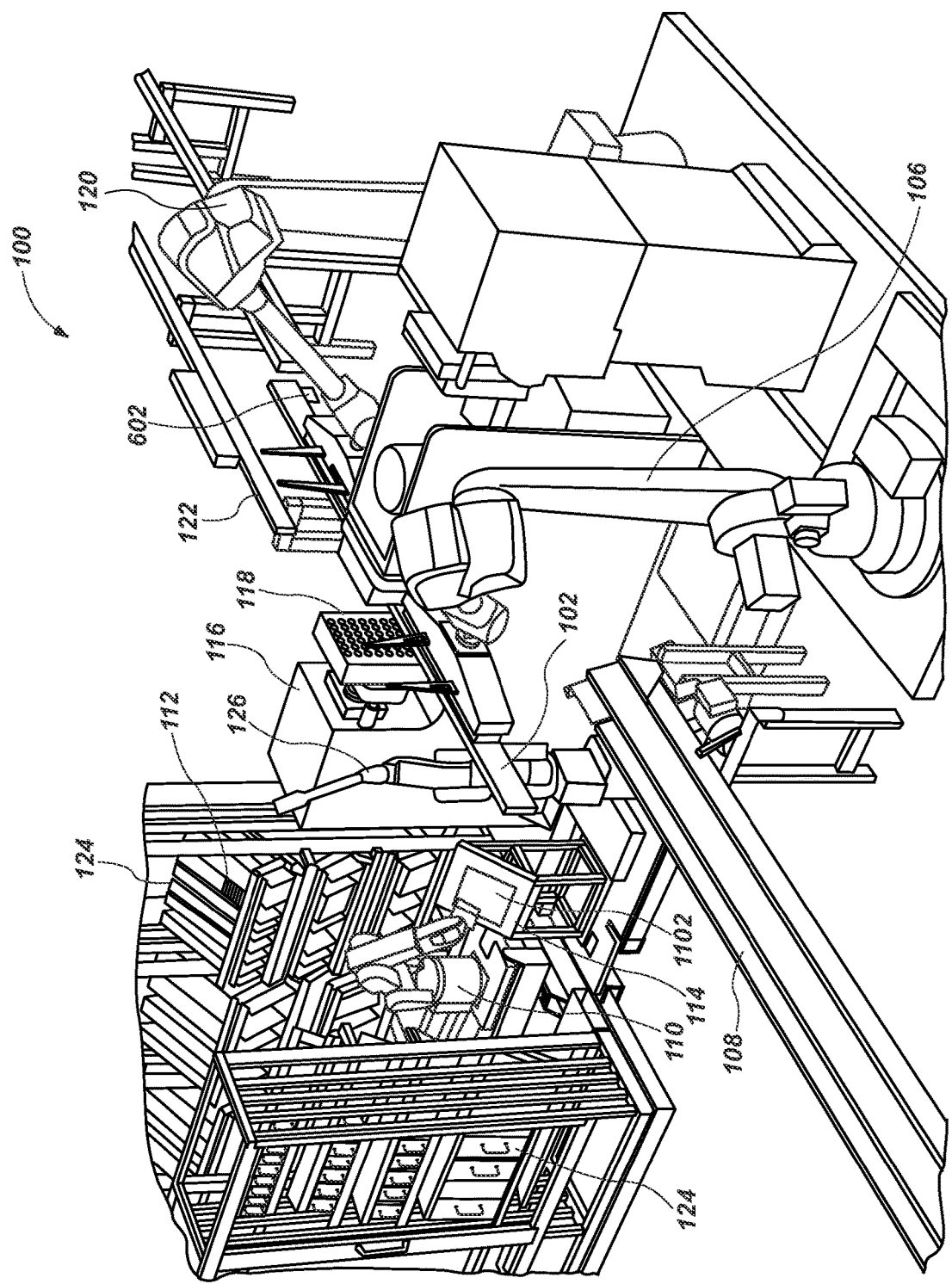
FIG. 11 is a perspective view of the pre-plating system transferring the structural member to an outfeed robot.

Referring to FIGS. 2 and 11 together, the method 200 also includes transferring 216 the structural member 102 from the infeed robot 106 to an outfeed robot 120. FIG. 11 illustrates the infeed robot 106 handing off the structural member 102 to the outfeed robot 120. In some embodiments there may be a sequence in which the press 116 holds the structural member 102 while the infeed robot 106 and/or the outfeed robot 120 exchange or sequentially secure the structural member 102 (e.g., the infeed robot 106 may release the structural member 102 while the press 116 holds the structural member 102 and the outfeed robot 120 may secure the structural member 102 before the press 116 releases the structural member 102). In some embodiments, an intelligent conveyor system (see the intelligent conveyor system 150 in FIG. 1B) may transfer the structural member 102 to the outfeed robot 120 (or the press 116). In some embodiments, the infeed robot 106 (or press 116) may transfer the structural member 102 to an outfeed intelligent conveyor system. In some embodiments, an infeed intelligent conveyor system may transfer the structural member 102 to an outfeed intelligent conveyor system. In some embodiments, the intelligent conveyor system 150 comprises both the infeed and outfeed delivery systems 108, 122 and the transfer may be no more than movement of (a portion of) the structural member 102 past the press 116.

FIG. 11 also illustrates the plate picking robot 110 placing another plate 1102 on the transfer pedestal 114. The other plate 1102 is transferred from the transfer pedestal 114 to the press surface 118 of the press 116, as discussed above with reference to FIG. 8 and transferring 212.

Figure 12:
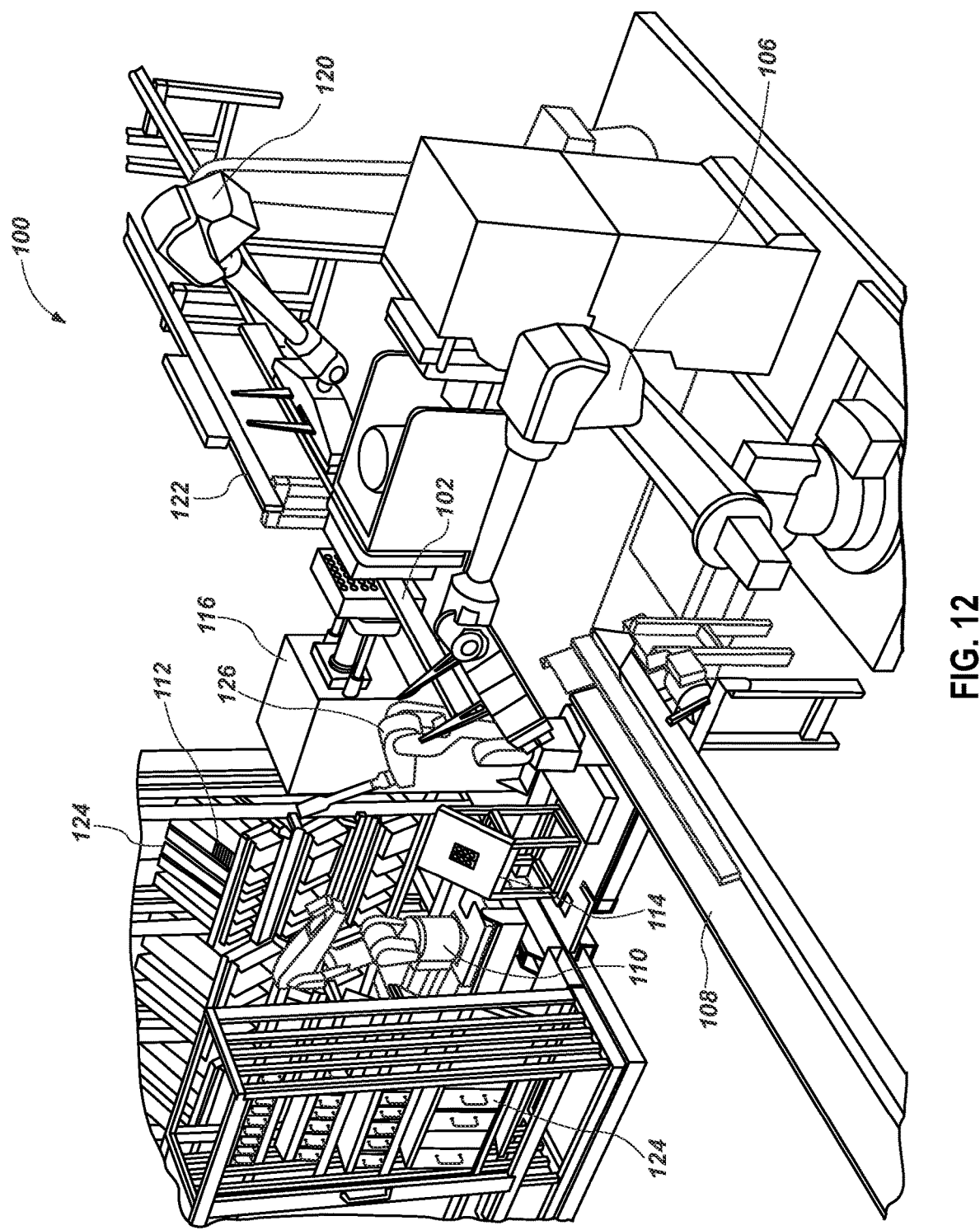
FIG. 12 is a perspective view of the pre-plating system repositioning the structural member within the press using the outfeed robot.

FIG. 12 illustrates the outfeed robot 120 positioning the structural member 102 within the press 116 while the press 116 presses the other plate 1102 into the structural member 102.

Figure 13:
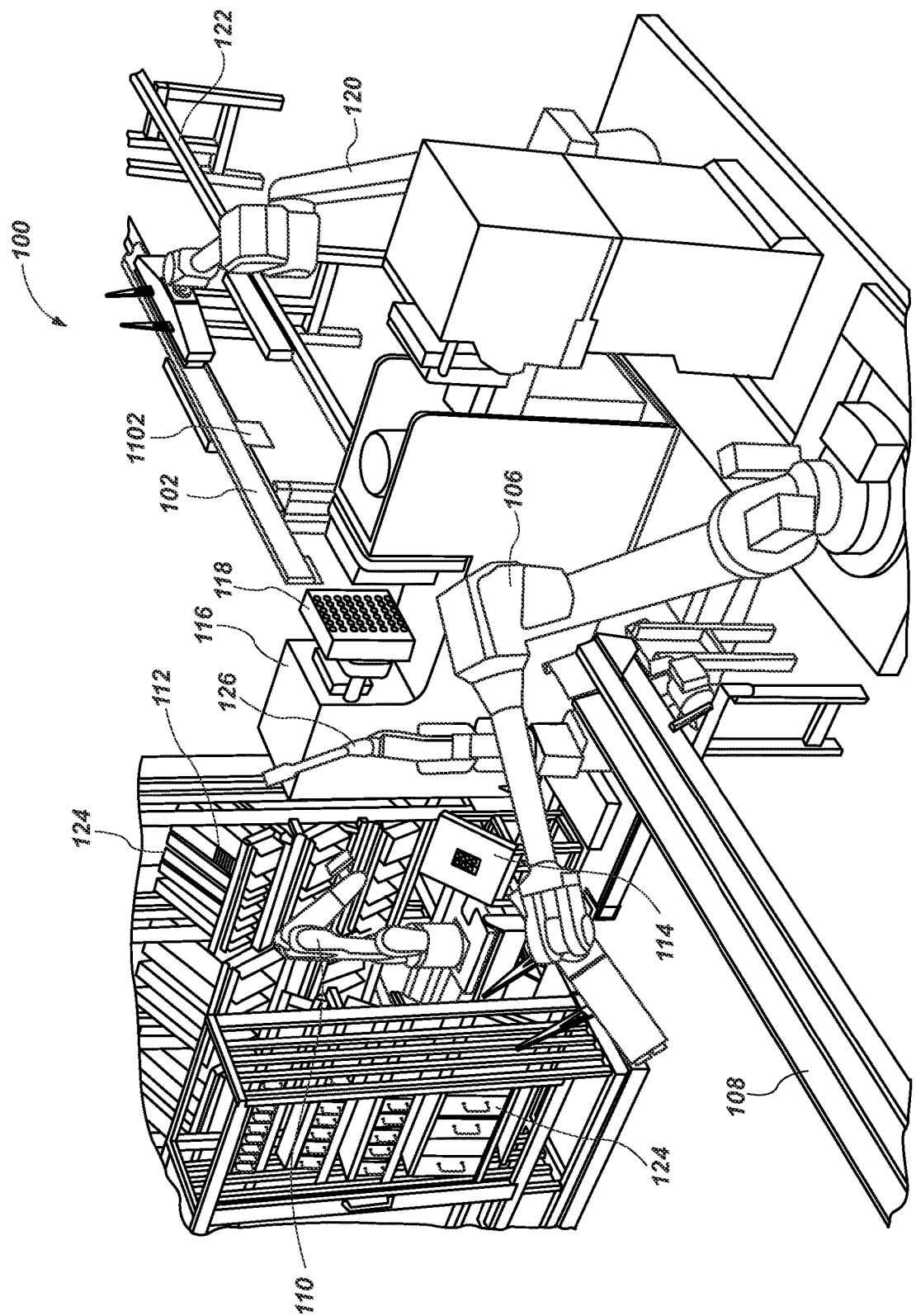
FIG. 13 is a perspective view of the pre-plating system delivering the truss member to an outfeed delivery system.

Referring now to FIGS. 2 and 13, the method 200 further includes delivering 218 the structural member 102 carrying the plate 602 and the other plate 1102 to an outfeed delivery system 122 configured to carry the structural member 102 from the pre-plating system 100.

Figure 14:
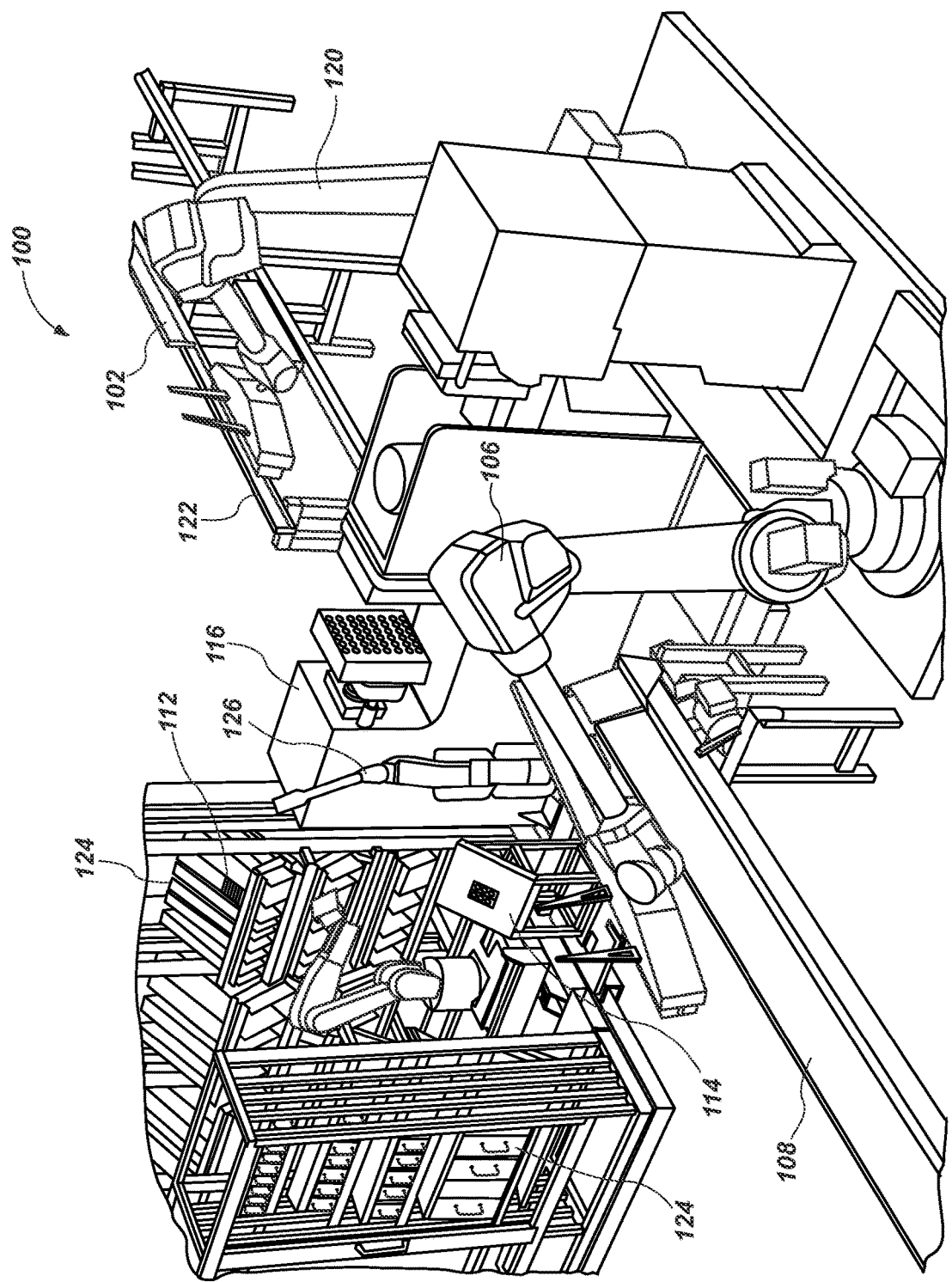
FIG. 14 is a perspective view of the pre-plating system carrying the structural member away from the pre-plating system.

FIG. 14 illustrates the outfeed delivery system 122 carrying the structural member 102 away from the pre-plating system 100. The outfeed delivery system 122 may transport the now pre-plated structural member 102 to an assembly system (e.g., an assembly table on which a structural component may be assembled by joining multiple structural members).

Figure 15:
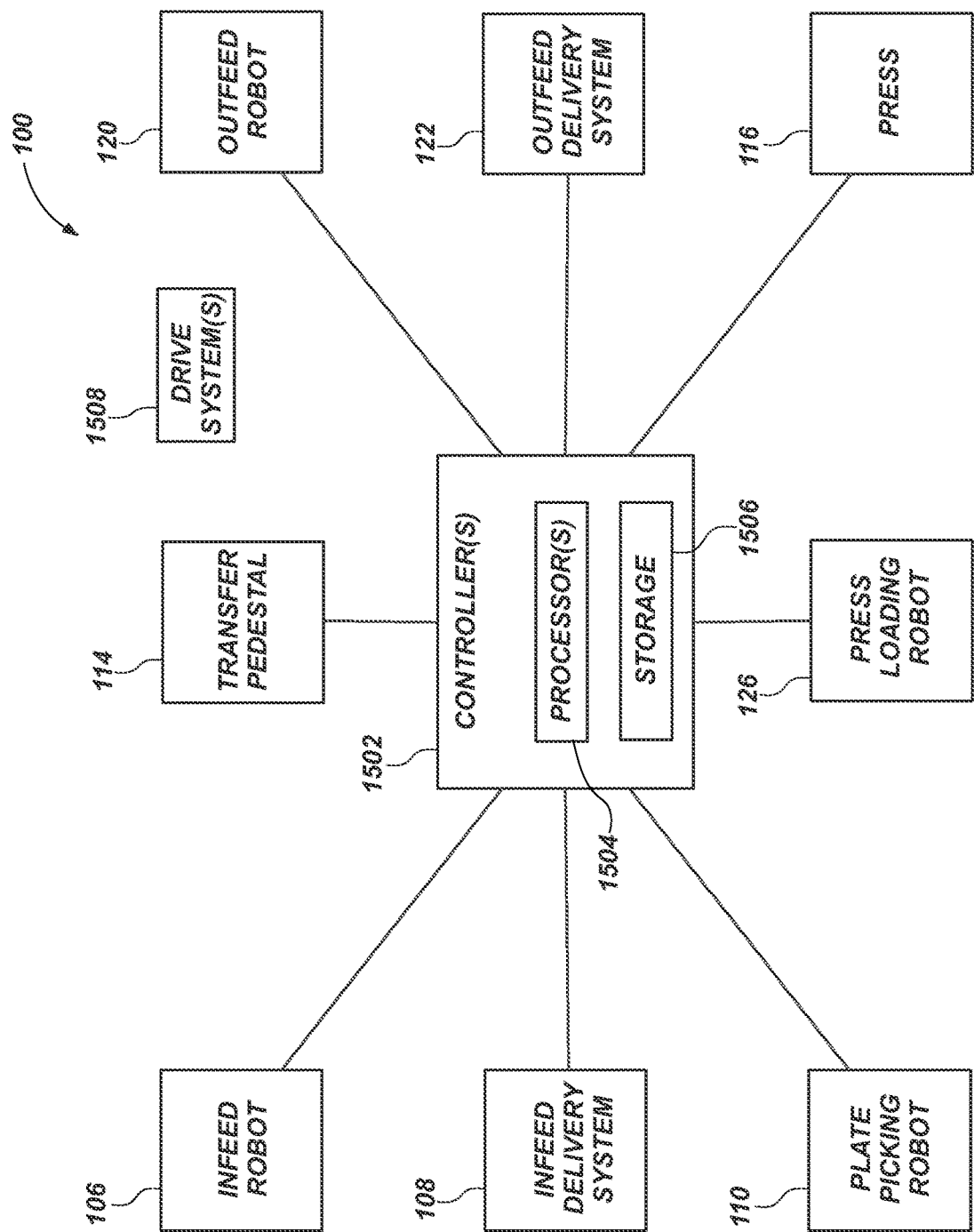
FIG. 15 is a block diagram of a pre-plating system, according to some embodiments.

FIG. 15 is a block diagram of the pre-plating system 100 of FIG. 1A, according to some embodiments. The pre-plating system 100 includes the infeed robot 106, the infeed delivery system 108, the plate picking robot 110, the transfer pedestal 114, the press 116, the outfeed robot 120, the outfeed delivery system 122, and the press loading robot 126, as discussed above. The pre-plating system 100 also includes at least one controller 1502 and one or more drive systems 1508. The controller 1502 may include a central processing unit (CPU), a microcontroller, a programmable logic controller (PLC), a field programmable gate array (FPGA), other programmable device, or combinations thereof. The controller 1502 is configured to control one or more aspect of operation of one or more of the infeed robot 106, the infeed delivery system 108, the plate picking robot 110, the transfer pedestal 114, the press 116, the outfeed robot 120, the outfeed delivery system 122, the intelligent conveyor system (see the intelligent conveyor system 150 in FIG. 1B), and the press loading robot 126, or the drive systems 1508 according to embodiments discussed above. For example, the controller 1502 may be configured to at least partially control motion of one or more of the infeed robot 106, the plate picking robot 110, the press loading robot 126, or the outfeed robot 120. Also, the controller 1502 may be configured to at least partially control the infeed delivery system 108 and/or the outfeed delivery system 122. The controller 1502 may, in some embodiments, be configured to control electromagnets of the transfer pedestal 114 and/or the press 116. The controller 1502 may also be configured to control the press 116. The controller 1502 may provide input to the intelligent conveyor system to control the advancing, stopping, clamping, and unclamping of the intelligent conveyor system 150.

In some embodiments, the controller 1502 includes one or more processors 1504 and one or more data storage devices 1506 (hereinafter referred to as "storage" 1506). The storage 1506 may include nonvolatile storage (e.g., flash memory, a hard disc drive, a solid state drive, etc.), volatile storage (e.g., random access memory (RAM), etc.) or combinations thereof. The storage 1506 may, in some embodiments, include computer-readable instructions stored thereon. The computer-readable instructions are configured to instruct the processors 1504 to perform control of the infeed robot 106, the infeed delivery system 108, the plate picking robot 110, the transfer pedestal 114, the press 116, the outfeed robot 120, the outfeed delivery system 122, or the press loading robot 126 according to one or more operations discussed above. In some embodiments, the computer-readable instructions of the storage 1506 may enable the controller 1502 to control the intelligent conveyor system 150. In some embodiments, the intelligent conveyor system 150 may comprise a controller 1502, a processor 1504, and storage 1506 containing computer-readable instructions to operate the intelligent conveyor system 150.

The storage 1506 may also be configured to store information that is useful for operating the pre-plating system 100. For example, the storage 1506 may be configured to store information relating to geometries and/or positions of various components of the pre-plating system 100 to enable the controller 1502 to determine a position of a centroid of the structural member 102, a position of a center of a plate 602, a location of the press 116, and other such information.

The drive systems 1508 are configured to drive mechanical motion or other operation of one or more of the infeed robot 106, the infeed delivery system 108, the plate picking robot 110, the transfer pedestal 114, the press 116, the outfeed robot 120, the outfeed delivery system 122, or the press loading robot 126 according to embodiments discussed above. For example, the drive systems 1508 may include an electrical drive system, a pneumatic drive system, a hydraulic drive system, a combustion engine system, other drive systems, or combinations thereof. In some embodiments the controller 1502 may be configured to control the drive systems 1508.

Figure 16:
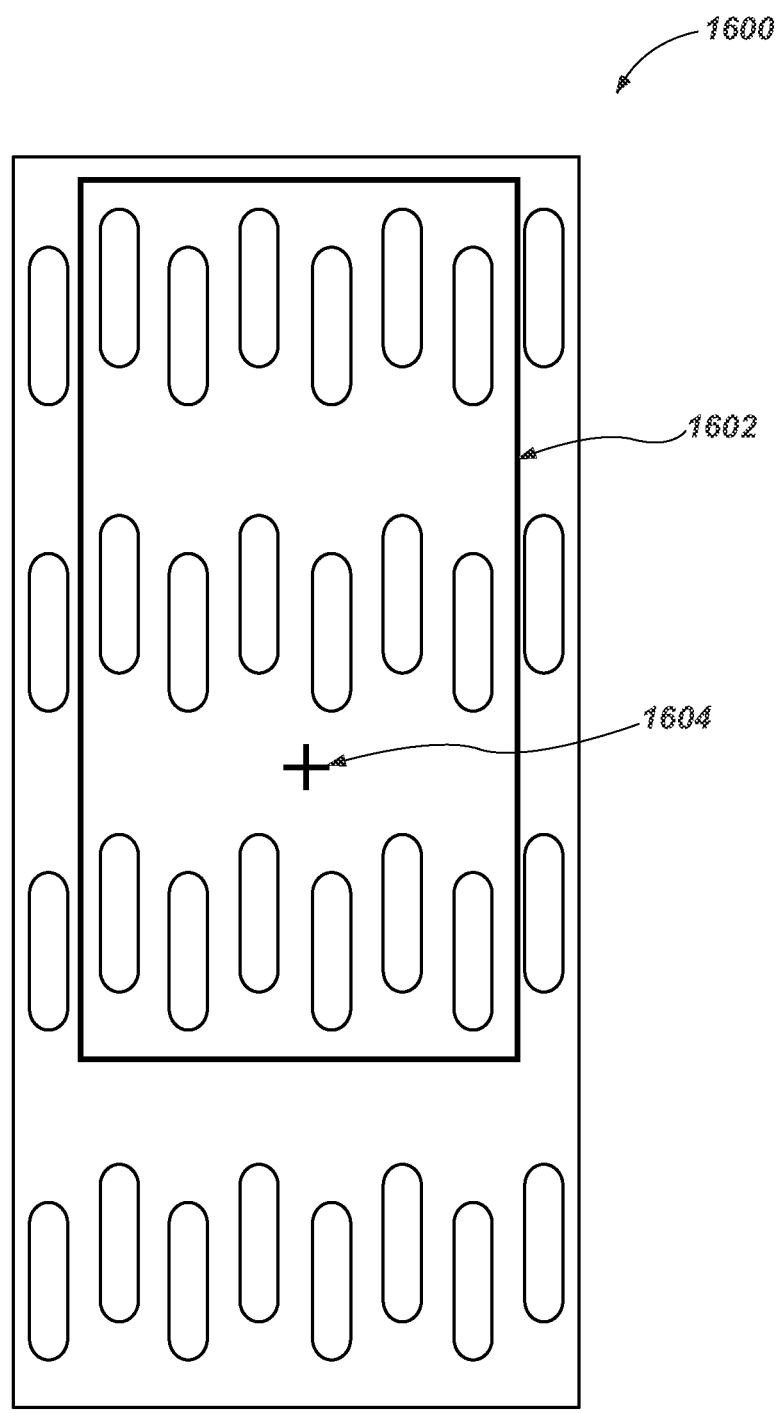
FIG. 16 is a front view of an example of a plate, according to some embodiments.

FIG. 16 is a front view of an example of a plate 1600, according to some embodiments. The plate 1600 of FIG. 16 includes a teeth pattern of rows of holes/teeth, each row having oscillating positions of holes/teeth. A gripper coverage area 1602 and a center 1604 of the plate 1600 are also shown in FIG. 16. In some embodiments, a universal gripper may position itself according to the gripper coverage area 1602 based on the center 1604 of the plate 1600.

Figure 17:
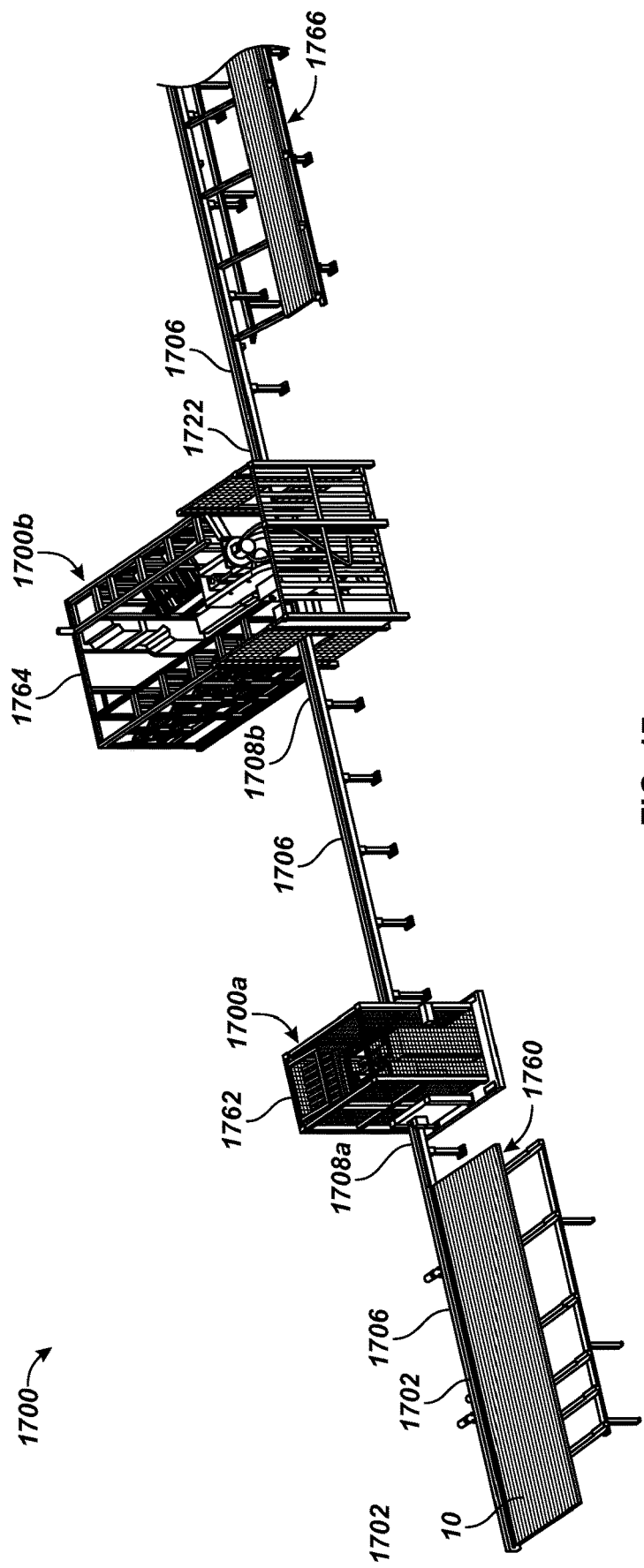
FIG. 17 is a perspective view of a plating system that includes both a splicing system and a pre-plating system, according to an embodiment of the present disclosure.

FIG. 17 is a perspective view of a plating system 1700 of a building component assembly system, according to one embodiment of the present disclosure. The plating system 1700 comprises a splicing station 1762 (including a first pre-plating system 1700*a*) and a pre-plating station 1764 (comprising a second pre-plating system 1700*b*), according to an embodiment of the present disclosure.

The plating system 1700 comprises an infeed magazine 1760, a first infeed delivery system 1708*a*, a splicing station 1762, a second infeed delivery system 1708*b*, a pre-plating station 1764, an outfeed delivery system 1722, and an outfeed magazine 1766. Source material 10, e.g., dimensional lumber, may be loaded, placed, or stored at the infeed magazine 1760 and may be sequentially delivered to the splicing station 1762 by a transport 1706 (e.g., an intelligent conveyor system), according to an embodiment of the present disclosure. The transport 1706 may include a first infeed delivery system 1708*a*, which may be an infeed robot In some embodiments, the source material 10 may be pre-cut to appropriate lengths and disposed at the infeed magazine 1760 in a designated order for supplying to the infeed delivery system 1708*a*. In some embodiments, the source material 10 may be pre-cut to appropriate lengths and disposed at the infeed magazine to be programmatically selectable (as by a robotic mechanism) and placed at the first infeed delivery system 1708*a*. In some embodiments, a separate cutting station (not shown) may be interposed between the infeed magazine 1760 and the splicing station 1762.

In some embodiments, the source material 10 may be cut to length for use as a chord, a chord member, a vertical member, a diagonal member, etc., such as appropriate to construct a truss building element. Cut-to-length source material 10 may be a structural member 1702. The first infeed delivery system 1708*a* may be configured to advance a structural member 1702 toward the splicing station 1762 and to dispose the structural member 1702 in a desired splicing position at the splicing station 1762. In some embodiments, a desired splicing position potentially includes two structural members 1702 end-to-end in abutment between a pair of plating surfaces, as described more fully below. In some embodiments, a desired splicing position potentially includes a rotation of the structural member 1702 about a longitudinal axis of the structural member 1702.

The splicing station 1762 may comprise a pre-plating system 1700*a* that may be similar to the splicing station 1800 shown in FIGS. 18A-D and described below with reference to the same. In other embodiments, the pre-plating system 1700*a* of the splicing station 1762 may be similar to the pre-plating system 100 of FIGS. 1A/1B, et seq. The splicing station 1762 of the first pre-plating system 1700*a* may be configured to plate together a first structural member 1702 and a second structural member 1702 with a leading end of the second structural member 1702 abutted against a trailing end of the first structural member 1702, whereby the first and second structural members 1702 form a chord or a chord member that has a greater length than either the first structural member 1702 or the second structural member 1702 prior to the splicing. One or more presses may be configured to plate a pair of plates (e.g., nail plates) on opposing surfaces (e.g., the pair of vertically oriented surfaces) of the first and second structural members 1702 overlapping a point of abutment of the ends of the first and second structural members 1702. Additional structural members 1702 may similarly be sequentially abutted and plated to the lengthened structural member (e.g., chord) formed of the first and second structural members 1702, whereby an even longer structural member (e.g., an even longer chord) may be formed.

The transport 1706 may transport all structural members of a building component through the splicing station 1762. In other words, the splicing station 1762 may not splice some of the structural members 1702 that are transported on the transport 1706 through the splicing station 1762. In certain embodiments, one or more splicing guides may facilitate movement of structural members 1702 by the transport 1706, as described in more detail below.

The first pre-plating system 1700*a*, according to some embodiments, may be configured to rotate a structural member 1702, a chord member, or a chord about a longitudinal axis of the structural member 1702 before splicing to ensure plates are applied to an appropriate splicing surface. The first pre-plating system 1700*a*, according to some embodiments, may be configured to rotate a structural member 1702, a chord member, or a chord about a longitudinal axis of the structural member 1702 after splicing in preparation for pre-plating at the pre-plating station 1764.

Disposed between the splicing station 1762 and the pre-plating station 1764 is a second infeed delivery system 1708*b*. The second infeed delivery system 1708*b* may comprise both an outfeed delivery system to receive a structural member 102 from the splicing station 1762 and an infeed delivery system to deliver the structural member 1702 to the pre-plating station 1764. The second infeed delivery system 1708*b* may further be configured to rotate the structural member 102 about a longitudinal axis of the structural member 1702 in preparation for pre-plating at the pre-plating station 1764.

The pre-plating station 1764 may comprise a pre-plating system 1700*b*, which may be similar to the pre-plating station 2000 shown in FIGS. 20A-C and described below with reference to the same. In other embodiments, the pre-plating station 1764 may comprise a second pre-plating system 1700*b* similar to the pre-plating system 100 of FIG. 1A/1B, et seq. The pre-plating system 1700*b* of the pre-plating station 1764 may be configured to pre-plate structural members 1702 preparatory to assembly into a building component. For example, a structural member 1702 defining a chord may be pre-plated preparatory to receiving a vertical member of a truss, a diagonal member of a truss, etc., as described above in greater detail.

In some embodiments, the pre-plating system 1700*b* is configured to press plates into a surface of the structural member 1702 other than as plated at the splicing station 1762, or to facilitate plating to multiple surfaces of the structural member 1702. For example, the press of the splicing station 1762 may be configured to press a pair of plates into each of the 4" sides of a structural member 1702 cut from a 2×4 piece of lumber, whereas the press of a pre-plating system 1700*b* may be oriented to pre-plate (i.e., press a plate) into a 2" side of that same 2×4 as it is transported through the plating system 1700. Stated differently, the pre-plating system 1700*b* may be configured to press plates into a surface of the structural member 1702 that is transverse (e.g., perpendicular) to splicing surfaces (e.g., two opposing surfaces into which splicing plates are plated).

In some embodiments, the press of the second pre-plating system 1700*b* of the pre-plating station 1764 may be oriented transverse to (e.g., perpendicular to) the press of the first pre-plating system 1700*a* of the splicing station 1762. With the press oriented to press a plate into a structural member in a downward (or upward) trajectory, it may be possible to both pick the plate and load the plate into the press with a single robot. For example, a plate picking robot can pick the plate from a container, determine appropriate orientation of the plate (including orientation to contact the press surface and orientation within a plane of the press surface) and may have sufficient reach or range of motion to insert the plate into the press at the press surface for pressing into a structural member 1702. By contrast, the pre-plating system 100 of FIG. 1A includes a plate picking robot 110, a transfer pedestal 114, and a press loading robot 126, because the orientation of the press 116 is such that access to the press surface 118 is beyond the reach or range of the plate picking robot 110 (see FIG. 1A). The orientation of the press of the pre-plating system 1700*b* may enable a single plate picking robot to pick, from one of a plurality of containers, a plate to be used at a joint between two or more structural members and then to place the plate on a press surface of the press at an appropriate or desired orientation.

In some embodiments, the pre-plating system 1700*b* of the pre-plating station may be configured to rotate a structural member 1702 about a longitudinal axis of the structural member 1702 to facilitate plating to a surface of the structural member 1702 other than as plated at the splicing station 1762, or to otherwise facilitate plating to multiple surfaces of the structural member 1702. In other words, the press of the pre-plating system 1700*b* may be oriented at a same or similar orientation as the press of the splicing station 1762 such that the structural member 1702 must be rotated to achieve splicing on splicing sides and then pre-plating on one or more pre-plating sides that are transverse (e.g., orthogonal) to the splicing sides.

The transport 106 may further include an outfeed delivery system 1722, which may be configured to receive a structural member 1702 from the pre-plating station 1764. Furthermore, the outfeed delivery system 1722 may be configured to rotate the structural member 1702 about a longitudinal axis of the structural member 102. The outfeed delivery system 1722 may be configured to dispose the structural member 102 at the outfeed magazine 1766. In some embodiments, an additional third infeed delivery system may take the place of the outfeed delivery system 1722 to facilitate delivery of the structural member 1702 to another station of the building component assembly system 1700. For example, without limitation, an assembly station, or an additional pre-plating system 1700*b*, may receive pre-plated structural members from the pre-plating station 1764. In some embodiments, the outfeed delivery system 1722 may be configured to deliver the structural member 1702 to the outfeed magazine 1766, wherein the outfeed magazine 1766 comprises a table to receive the structural member 1702. In some embodiments, the outfeed delivery system 1722 may be configured to dispose the structural member 1702 to a loading station to, for example, permit loading of the structural member 102 on a forklift, a truck, etc. In some embodiments, the outfeed delivery system 1722 or the outfeed magazine 1766 may comprise a robotic mechanism for stacking, packing, etc., the structural member 1702. In some embodiments, the outfeed delivery system 1722 may comprise a sorting system whereby each structural member 1702 is selectively deliverable to a location based on programmatic input and control, as by a multi-conveyor system.

The disclosed embodiments can be utilized to plate one or more structural members 1702 for any of a variety of applications, including trusses, walls, floors, and any element of construction. The disclosed embodiments may be particularly useful in pre-fabrication of floor trusses, which are constructed with two chords and with vertical structural members and diagonal structural members extending between the chords. Often a single piece of lumber is not long enough to form one or more chords of a desired length for a floor truss, and accordingly two or more structural members need to be spliced together into a single structural member. The building component assembly system 1700 of FIG. 17 can be utilized to both splice and pre-plate chords of a floor truss. Structural members 1702 can be spliced into longer structural members at the splicing station 1762 and also pre-plated at the pre-plating station 1764 in one or more joint locations for adjoining vertical and diagonal members between two chords.

Figure 18A:
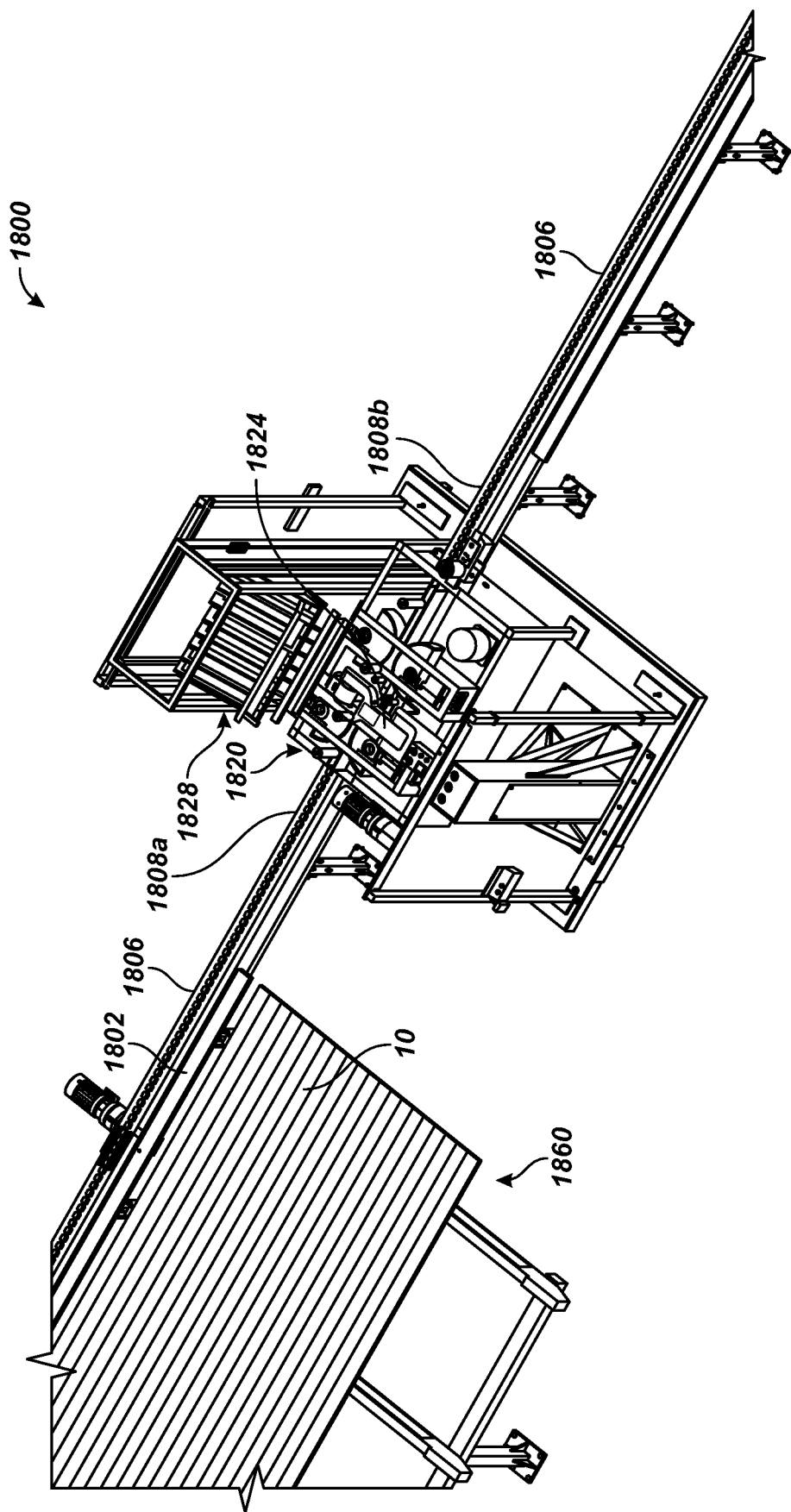
FIG. 18A is a perspective view of a splicing station of a plating system, according to an embodiment of the present disclosure.

FIG. 18A is a perspective view of a splicing station 1800 of a plating system, according to an embodiment of the present disclosure. The splicing station 1800, in one embodiment, may comprise or be similar to the pre-plating system 1700*a* of FIG. 17. The splicing station 1800 includes a transport 1806, a splicing press 1820, a splicing press loading robot 1824, and a plate container rack 1828. The splicing station 1800 may be configured to plate together a first structural member 1802 and a second structural member 1802 with a leading end of the second structural member 1802 abutted against a trailing end of the first structural member 1802. The splicing station 1800 thereby splices the first and second structural members 1802 together to form a lengthened structural member (e.g., a chord or a chord member) that has a greater length than either the first structural member 1802 or the second structural member 1802 prior to the splicing. The splicing press 1820 may be configured to plate a pair of plates (e.g., nail plates) on opposing surfaces (e.g., the pair of vertically oriented surfaces) of the first and second structural members 1802, overlapping a point of abutment of the ends of the first and second structural members 1802. Additional structural members 1802 may similarly be sequentially abutted and plated to the lengthened structural member formed of the first and second structural members 1802, whereby an even longer structural member (e.g., an even longer chord) may be formed.

The transport 1806 may comprise a conveyor (or conveyor system) and may include an infeed robot 1808*a* (e.g., a conveyor) and an outfeed robot 1808*b* (e.g., a conveyor). The transport 1806 may transport source material 10, e.g., dimensional lumber, from an infeed magazine 1860 to the splicing station 1800 via the infeed robot 1808*a*. The source material 10 may be loaded, placed, or stored at the infeed magazine 1860. In some embodiments, the source material 10 may be pre-cut into structural members 1802. The transport 1806 may transport all structural members 1802 of a building component through the splicing station 1800. In other words, the splicing station 1800 may splice some, but not all, of the structural members 1802 that are transported on the transport 1806 through the splicing station 1800. The transport 1806 may also transport spliced (and thereby lengthened) structural members 1802 and other structural members 1802 from the splicing station 1800 via the outfeed robot 1808*b*.

In other embodiments, the transport 1806 may comprise an infeed robot and the outfeed robot and are configured to position the structural member 1802 within the press 1820 based on a determined centroid of the structural member. In some embodiments, the infeed robot, the outfeed robot, or both, may be a multi-axis articulating arm as shown in FIG. 1A. The infeed robot and the outfeed robot may position the structural member 1802 within the press 1820 without the use of an indicia provided on or in the structural member 1802, but rather based on a centroid or other position relative to the structural member 1802.

It may be known that the structural member 1802 has a certain predetermined geometry (e.g., a 2×4, a 2×12, etc.), and that the transport 1806 will deliver the structural member 1802 to a known position and orientation. As a specific example, the structural member 1802 may have a known geometry, and the transport 1806 may be configured to convey a leading edge of the structural member 1802 to a pre-determined location, allowing the transport 1806 to estimate the location of the centroid relative to itself based on the known geometry and the known position of the leading edge. As another example, image sensors may be used to determine locations of edges and/or corners of the structural member 1802, and an estimate of the centroid may be determined based on the determined locations of the edges and/or corners. A further example of determining the location of the centroid includes the use of weight and/or mass measuring devices. Assuming that the truss member is approximately uniformly dense, the centroid may be determined by locating the center of mass of the structural member 1802.

The splicing press 1820, of the illustrated embodiment of FIG. 18A, comprises a plurality of press surfaces configured to press a pair of plates into a pair of structural members 1802 to splice the pair of structural members 1802 together. The press surfaces are to maintain the pair of splicing plates in an appropriate position on opposing sides of the structural members 1802 for the splicing press to plate the structural members 1802. In the illustrated embodiment of FIG. 18A, the splicing press 1820 also includes a plurality of cams that rotate from an open position out of contact with the structural members 1802 to a pressing position against the press surfaces and in contact with respective opposing surfaces of the structural member 1802 to press splicing plates into the abutting ends of the structural members 1802. The plurality of cams may be grouped in pairs (e.g., the splicing press 1820 may comprise one or more pairs of cams). The cams in each pair of cams may be positioned on opposing sides of the transport 1806. The cams of a pair of cams may rotate through the pressing position to return to the open position such that the rotation of the pair of cams in unison propels the spliced and lengthened structural member 1802.

The splicing press loading robot 1824 is configured to position splicing plates to be plated to the structural members 1802 by the splicing press 1820. The splicing press loading robot 1824 may be configured to pick a plate (e.g., a nail plate) from the plate container rack 1828 and move the plate to a press surface. The splicing press loading robot 1824 may be configured to pick the splicing plates from one of a plurality of splicing plate containers in the plate container rack 1828. The splicing plate containers may each hold splicing plates of a different size and/or different dimensions and the splicing press loading robot 1824 may determine an appropriate plate container to pick a plate from. The splicing press loading robot 1824 may select the container to pick a plate from based on specifications, requirements, and/or constraints of a building component being constructed with the structural members 1802 being spliced.

In some embodiments, the splicing press loading robot 1824 may include a robot arm assembly having a securing mechanism at its ends and one or more joints. The securing mechanisms (e.g., end of arm tool) at the end of the splicing press loading robot 1824 is configured to pick and secure a plate. By way of non-limiting example, the securing mechanisms at the end of the splicing press loading robot 1824 may include a magnet, an electromagnet that can be activated and deactivated to secure the plate thereto or release the plate, a suction mechanism (e.g., a vacuum system) configured to secure the plate thereto using suction, and a gripping mechanism (e.g., a claw) to grip the plate.

Figure 18B:
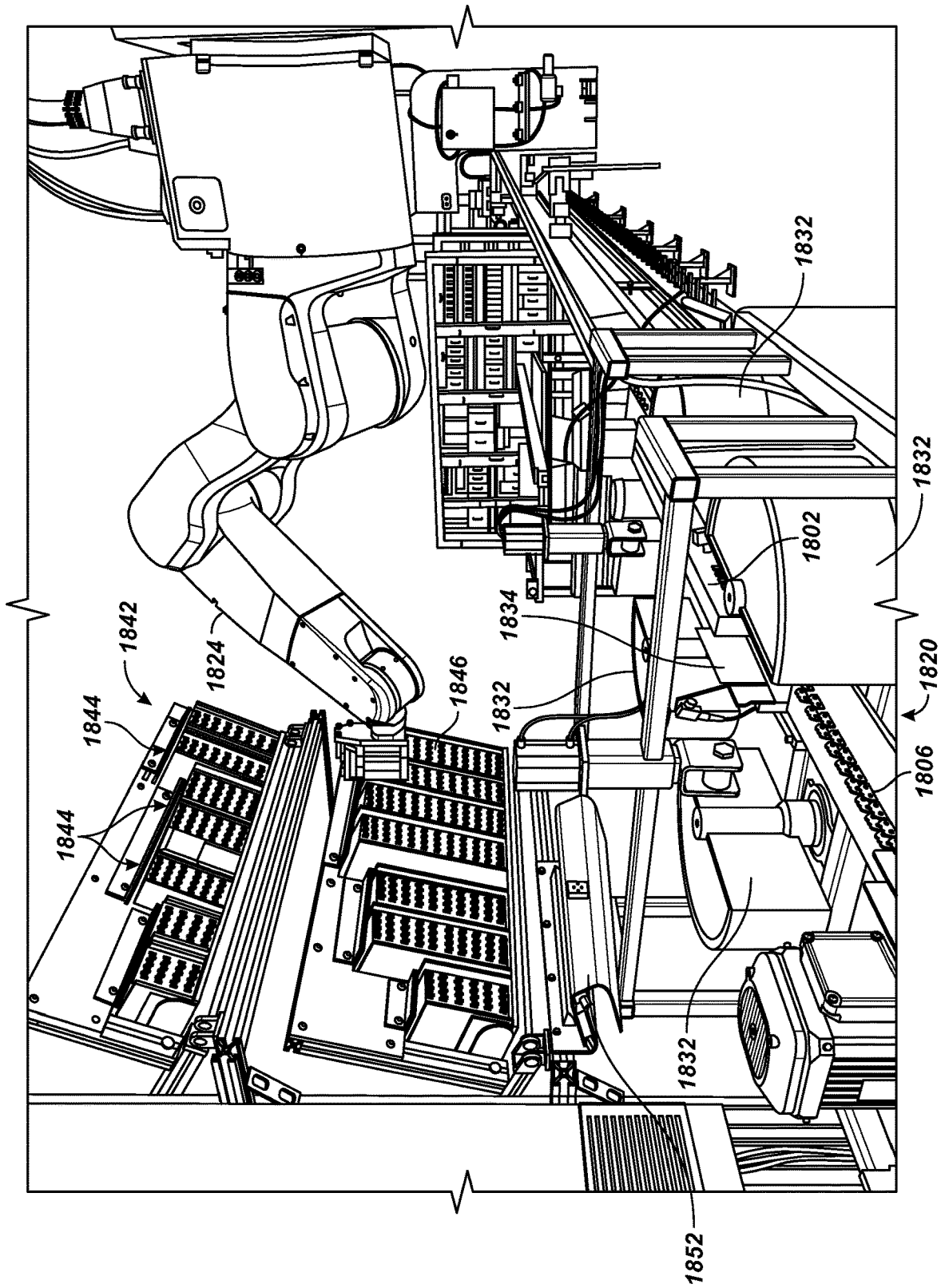
FIG. 18B is another perspective view of the splicing station of system FIG. 18A.

FIG. 18B is another perspective view of the splicing station 1800 of system FIG. 18A. The splicing station 1800 comprises a plurality of cams 1832 configured to rotate from an open position out of contact with the structural members 1802 to a pressing position against a pair of press surfaces 1834 and/or against respective opposing surfaces of the structural member 1802 to thereby press splicing plates into abutting ends of two structural members 1802. The plurality of cams 1832 may be grouped in pairs (e.g., the splicing press 1820 may comprise one or more pairs of cams) as shown. The cams 1832 in each pair of cams are positioned on opposing sides of the transport 1806. The cams 1832 rotate through the pressing position to return to the open position such that the rotation of the cams 1832 in unison propels the spliced and lengthened structural member 1802. The cams 1832 press (exert force on) a pair of press surfaces 1834, each configured to maintain a press plate. The force of the cams 1832 (transitioning to the pressing position) against the press surfaces 1834 presses a pair of plates into a pair of structural members 1802 to splice the pair of structural members 1802 together. The press surfaces 1834 are to maintain a pair of splicing plates in an appropriate position on opposing sides of the structural members 1802 for the splicing press to plate the structural members 1802.

In FIG. 18B, the plurality of cams 1832 of the splicing press 1820 are positioned in the open position to allow preparation for splicing and/or passage of a structural member 1802 into and/or through the splicing station 1800. The transport 1806 has positioned a first structural member 1802 in the splicing press 1820 and positioned with a trailing end between a pair of press surfaces 1834.

FIG. 18B also illustrates the splicing press loading robot 1824 picking a plate 1846 from one of a plurality of plate containers 1844 of the plate container rack 1842. The splicing press loading robot 1824 is configured to position splicing plates to be plated to the structural members 1802 by the splicing press 1820. The splicing press loading robot 1824 may be configured to pick a plate (e.g., a nail plate) from the plate container rack 1828 and move the plate to a press surface. The splicing press loading robot 1824 may be configured to pick the splicing plates from one of a plurality of splicing plate containers in the plate container rack 1828. The splicing plate containers 1844 may each hold splicing plates 1846 of a different size and/or different dimensions and the splicing press loading robot 1824 may determine an appropriate plate container 1844 to pick a plate from. The splicing press loading robot 1824 may select the plate container 1844 to pick a plate 1846 from based on specifications, requirements, and/or constraints of a building component being constructed with the structural members 1802 being spliced.

FIG. 18B also illustrates a splicing guide 1852 in a storage position. In FIG. 18B, the storage position of the splicing guide 1852 is at or near the plate container racks 1842. However, the storage position of the splicing guide 1852 may be anywhere within reach of the splicing press loading robot 1824. As will be discussed more fully below with respect to FIG. 18D, the splicing guide 1852 may be configured to be positioned at the transport 1806 to guide non-spliced structural members 1802.

Figure 18C:
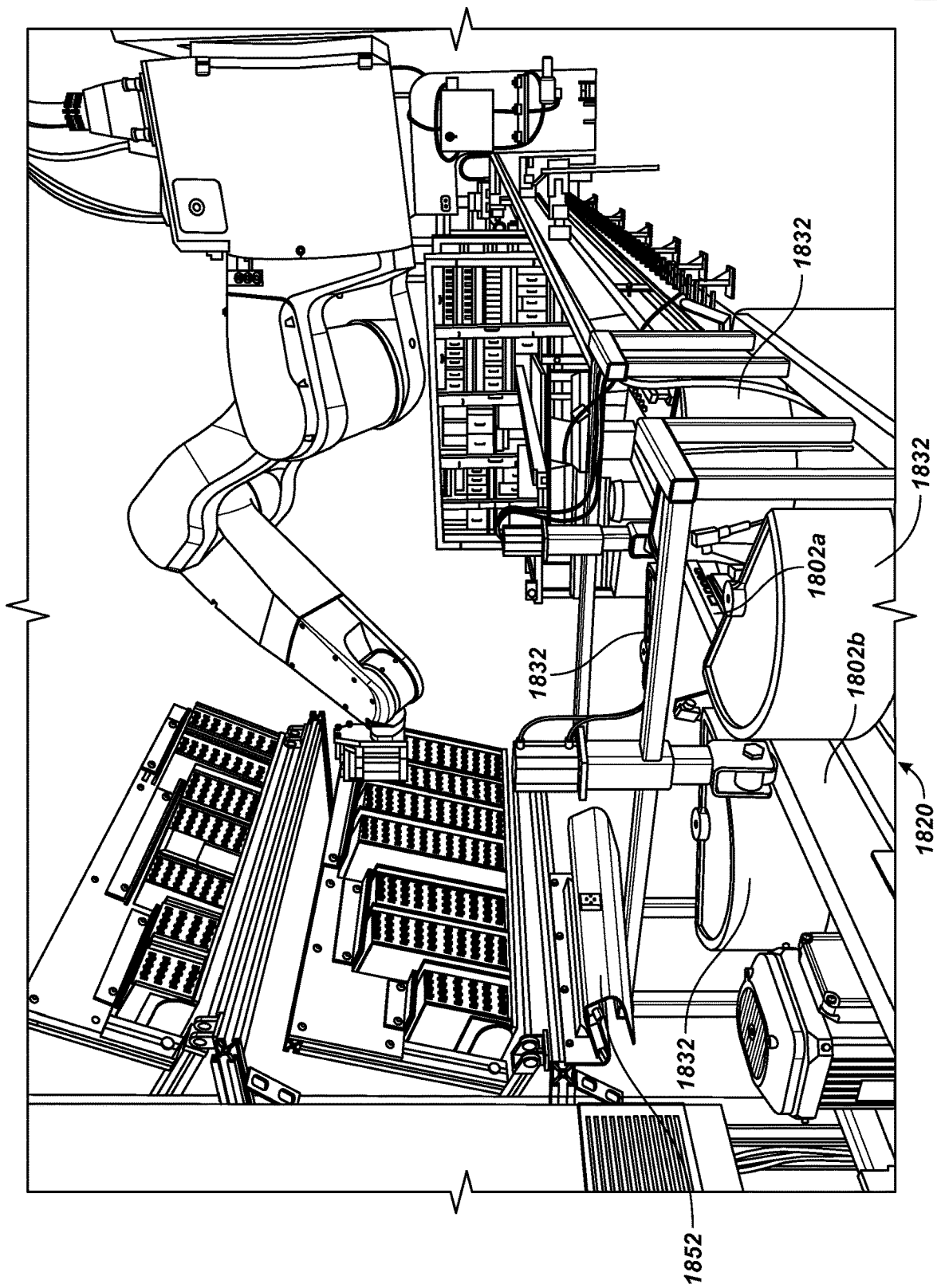
FIG. 18C is another perspective view of the splicing station of system FIG. 18A, with the cams pressing a pair of plates to plate and thereby splice together two structural members.

FIG. 18C is another perspective view of the splicing station 1800 of system FIG. 18A, with the cams 1832 in a pressing position and pressing a pair of plates to plate and thereby splice together a first structural member 1802a and a second structural member 1802b. The cams 1832 are configured to rotate as shown in FIG. 18C from the open position of FIG. 18B, which is out of contact with the structural members 1802, to a pressing position against a pair of press surfaces 1834 (not visible in FIG. 18C, but see FIG. 18B) and/or against respective opposing surfaces of the structural members 1802a, 1802b to thereby press splicing plates into abutting ends of two structural members 1802a, 1802b. The cams 1832 are configured to continue rotation through the pressing position to return to the open position such that the rotation of the cams 1832 in unison propels the spliced and lengthened structural member.

Figure 18D:
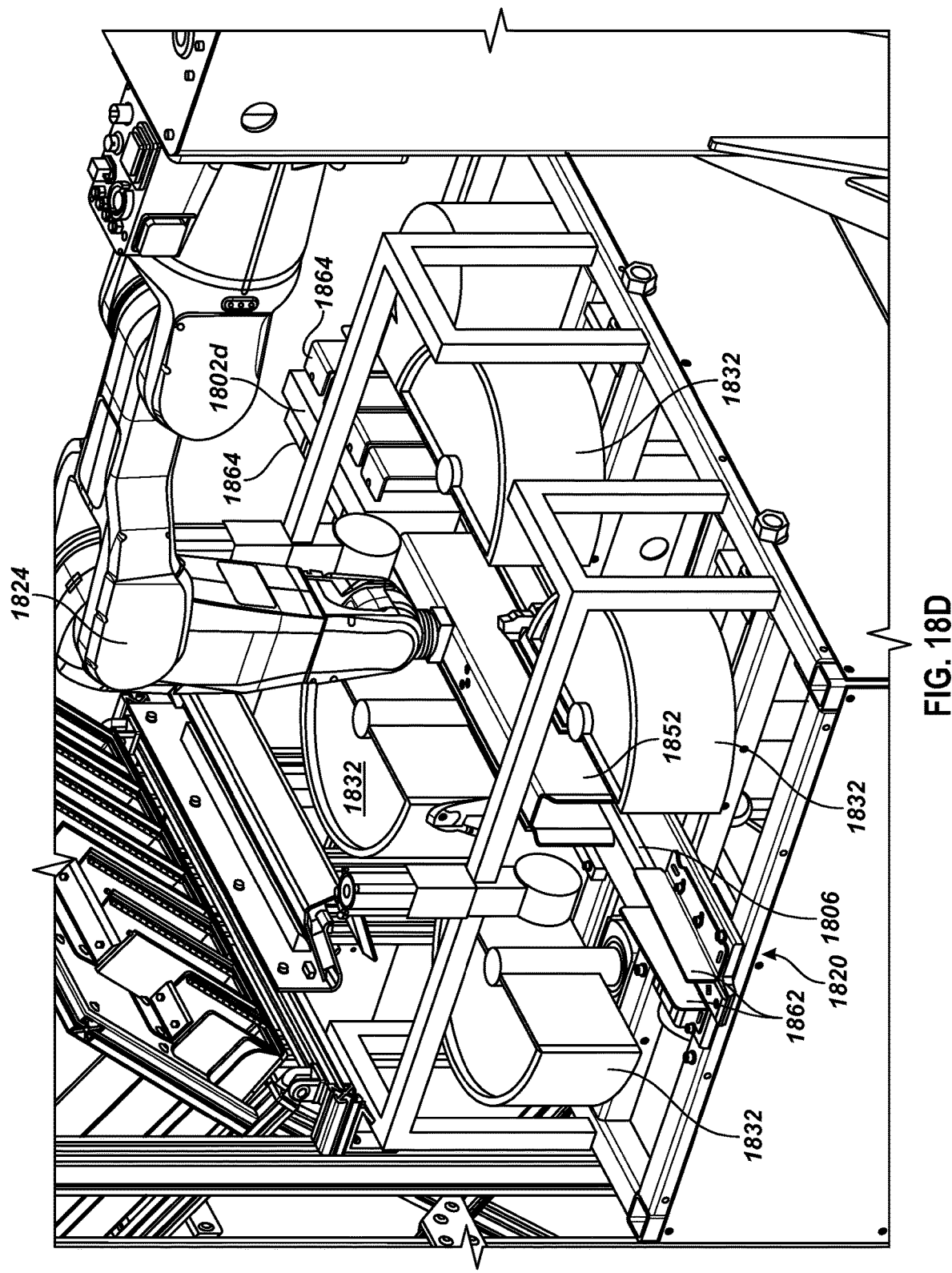
FIG. 18D is another perspective view of the splicing station of system FIG. 18A, with a splicing guide positioned to guide non-plated structural members through the splicing station.

FIG. 18D is another perspective view of the splicing station 1800 of the system of FIG. 18A, with a splicing guide 1852 positioned in a guiding position to guide a non-plated structural member 1802d through the splicing station 1800.

In FIG. 18D, the splicing press loading robot 1824 has moved the splicing guide 1852 from the storage position (see FIGS. 18B and 18C) to the guiding position. The splicing press loading robot 1824 may receive a signal from the transport 1806 or from a controller indicating when the splicing guide 1852 is needed (e.g., a non-spliced structural member 1802d that may have a length shorter than a distance between infeed guides 1862 and outfeed guides 1864) and should be placed in the guiding position. The transport 1806 may track and/or detect when a short structural member 1802d is approaching the splicing station 1800, may signal the splicing press loading robot 1824, and appropriately time or otherwise arrange that the short structural member 1802d is transported through the splicing station 1800 when the splicing guide 1852 is in place. The splicing press loading robot 1824 may secure or otherwise maintain the splicing guide in the guiding position during use. In the guiding position, the splicing guide 1852 is configured to guide a non-spliced structural member 1802d between the infeed guides 1862 and the outfeed guides 1864, which may be fixed.

As can be seen in FIG. 18D, the infeed guides 1862 are a distance from the outfeed guides 1864. The distance allows rotation of the cams 1832 and thereby the pressing of a plate into structural members. However, when a shorter structural member 1802d is being transported through the splicing station, without being spliced to another structural member, there is a potential that the shorter structural member 1802d could be knocked off or otherwise fall from the transport 1806. The splicing guide 1852 can limit or prevent such displacement of a shorter structural member 1802.

In the embodiment of FIG. 18D, the splicing guide 1852 is configured to function and/or otherwise interact with a shorter structural member 1802d as a tunnel with walls to guide the shorter structural member 1802d and a top to interface with and otherwise be secured by the splicing press loading robot 1824. As can be appreciated, a tunnel structure is but one embodiment and other forms of splicing guide may be utilized in connection with the splicing station 1800.

Figure 19A:
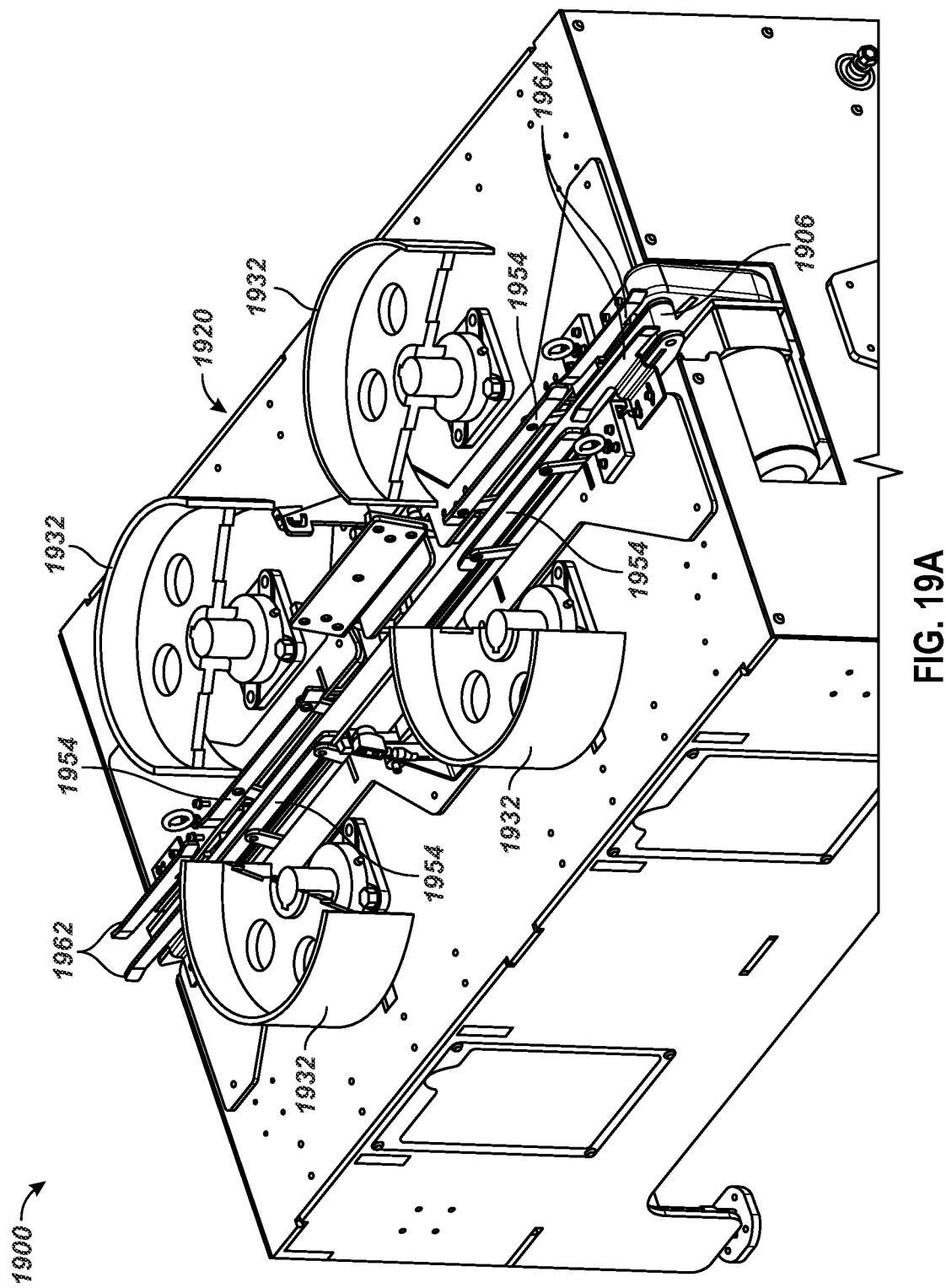
FIG. 19A is a perspective view of another splicing station of a plating system, according to another embodiment of the present disclosure.

FIG. 19A is a perspective view of another splicing station 1900 of a plating system, according to another embodiment of the present disclosure. The splicing station 1900, in one embodiment, may comprise or be similar to the pre-plating system 1700a of FIG. 17. The splicing station 1900 includes a transport 1906, a splicing press 1920, a splicing press loading robot (not shown though similar to the splicing press loading robot 1824 of FIG. 18), and a plate container rack (not shown though similar to the plate container rack 1828 of FIG. 18). The transport 1906 may include one or more conveyors. The splicing press 1920 includes a plurality of cams 1932, similar to the cams 1832 of FIG. 18. The splicing station 1900 may be configured to plate together a first structural member and a second structural member as described above with reference to FIG. 18. The splicing press 1920 may be configured to plate a pair of plates (e.g., nail plates) on opposing surfaces (e.g., the pair of vertically oriented surfaces) of the first and second structural members as previously shown and described. FIG. 19A also includes integrated splicing guides 1954 that retract into (below) the surface of the splicing press 1920 in an inoperable (or storage) configuration and that extend upward above the surface of the splicing press 1920 in an operable (or guiding) configuration. The splicing guides 1954 may be retracted to the inoperable configuration during splicing of structural members so as to not interfere with plating. In the operable configuration, the splicing guides 1954 raise upward above the surface of the splicing press 1920 and above a transport surface (e.g., belt of a conveyor) of the transport 1906 to guide non-spliced and/or shorter structural members to limit or even prevent such structural members from falling from the transport 1906 between the infeed guides 1962 and the outfeed guides 1964. In the embodiment of a splicing station 1900 shown in FIG. 19A, there are two pairs of splicing guides 1954. An infeed pair of splicing guides may initially guide the structural member and an outfeed pair of splicing guides may guide the structural member out of the splicing station. As can be appreciated, a variety of arrangements of splicing guides—one pair, multiple pairs—are within the scope of this disclosure.

Figure 19B:
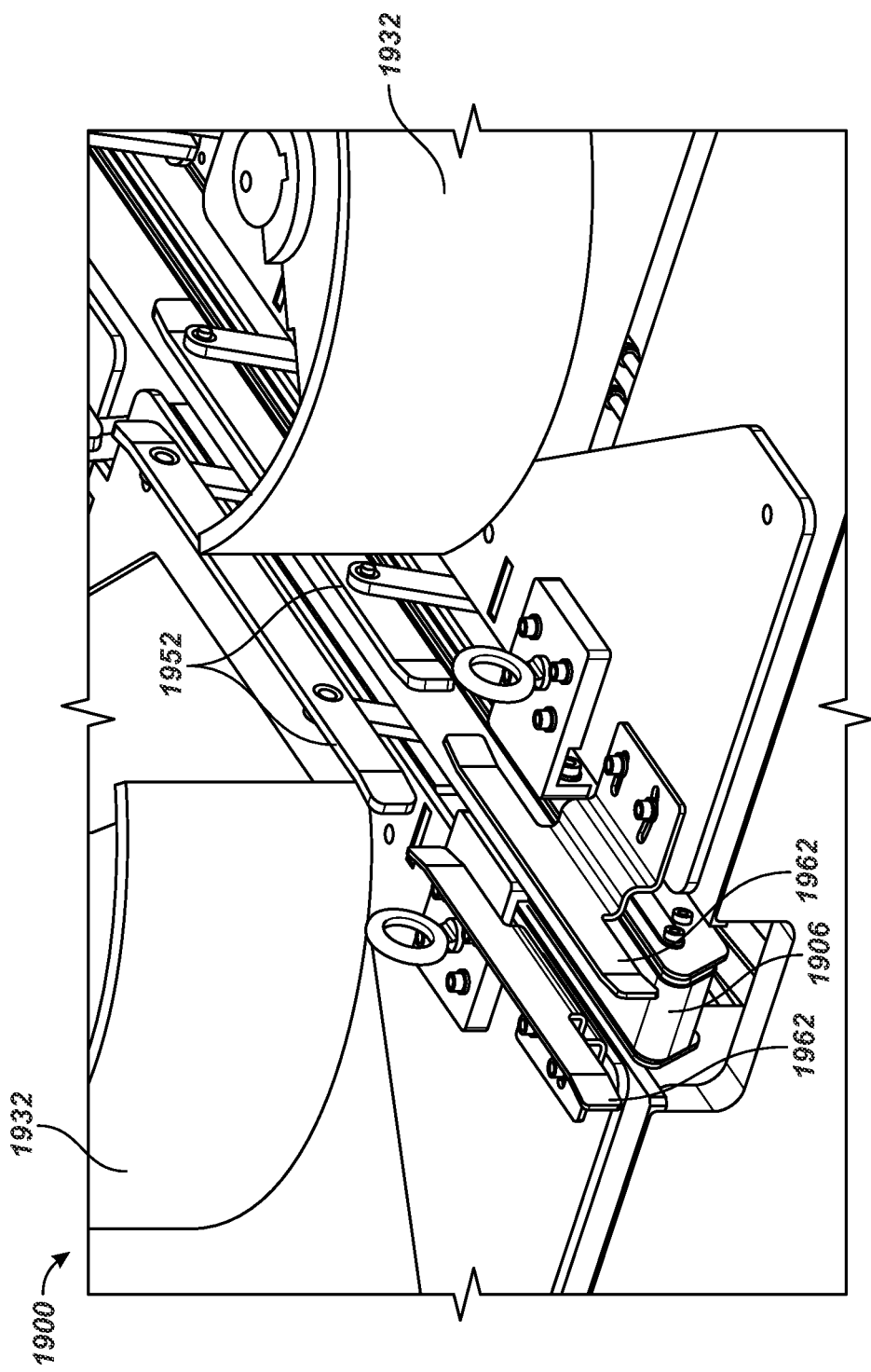
FIG. 19B is an enlarged detailed perspective view of a portion the splicing station of FIG. 19A.

FIG. 19B is an enlarged detailed perspective view of a portion of the splicing station 1900 of FIG. 19A. FIG. 19B illustrates the cams 1932, infeed guides 1962, transport 1906, and splicing guides 1954 in an operable (or guiding) configuration. As illustrated in FIG. 19B, the splicing guides 1954 may comprise a 4-bar linkage mechanism to raise and lower between the storage configuration and the guiding configuration. An actuator such as a motor or pneumatic actuator may be coupled to the splicing guides 1954 to transition them between the storage configuration and guiding configuration. As can be appreciated, in other embodiments, other mechanisms may be utilized to actuate or otherwise manipulate the integrated splicing guides 1954 to transition from the storage configuration to the guiding configuration and vice versa.

The splicing guides 1954 may receive a signal from the transport 1906 or from a controller indicating when the splicing guides 1954 are needed (e.g., an approaching non-spliced structural member that may have a length shorter than a distance between infeed guides 1962 and outfeed guides 1964) and should be transitioned into the guiding position. The transport 1906 may track and/or detect when a short structural member is approaching the splicing station 1900, may signal to the splicing guides to transition from the storage configuration to the guiding configuration. The transport 1906 may also appropriately time or otherwise arrange that the short structural member is transported through the splicing station 1900 when the splicing guides 1954 are in place.

In one embodiment, the splicing guides 1954 are, by default, in the guiding configuration shown in FIG. 19B. The splicing station 1900 (e.g., the transport 1906, or the splicing press 1920) detects when structural members to be spliced into lengthened structural members (e.g., to form chords of trusses) are loaded into the press for plating. When this splicing situation or condition is detected, a signal is sent to the splicing guides 1954 to transition from the guiding configuration to the storage configuration. Once splicing is completed and the lengthened structural member is transported out of the splicing station 1900, the splicing guides 1954 are signaled to transition or otherwise transitioned back to the guiding configuration.

In one embodiment, the splicing station 1900 may have a sequence of events triggered by an initial signal or sensor: detect (or receive signal indicating) structural members for splicing are loaded or being loaded into the press, position plates on press surfaces, drop the splicing guides, actuate the press to splice the structural members together, transport the lengthened structural member out of splicing station, and raise the splicing guides.

In other embodiments, sensors such as counters, scales, edge detectors, or the like can signal when an approaching sequence of structural members includes short structural members (e.g., webs of trusses). Signals from these sensors provide indication to the splicing guides 1954 of the appropriate configuration.

Figure 20A:
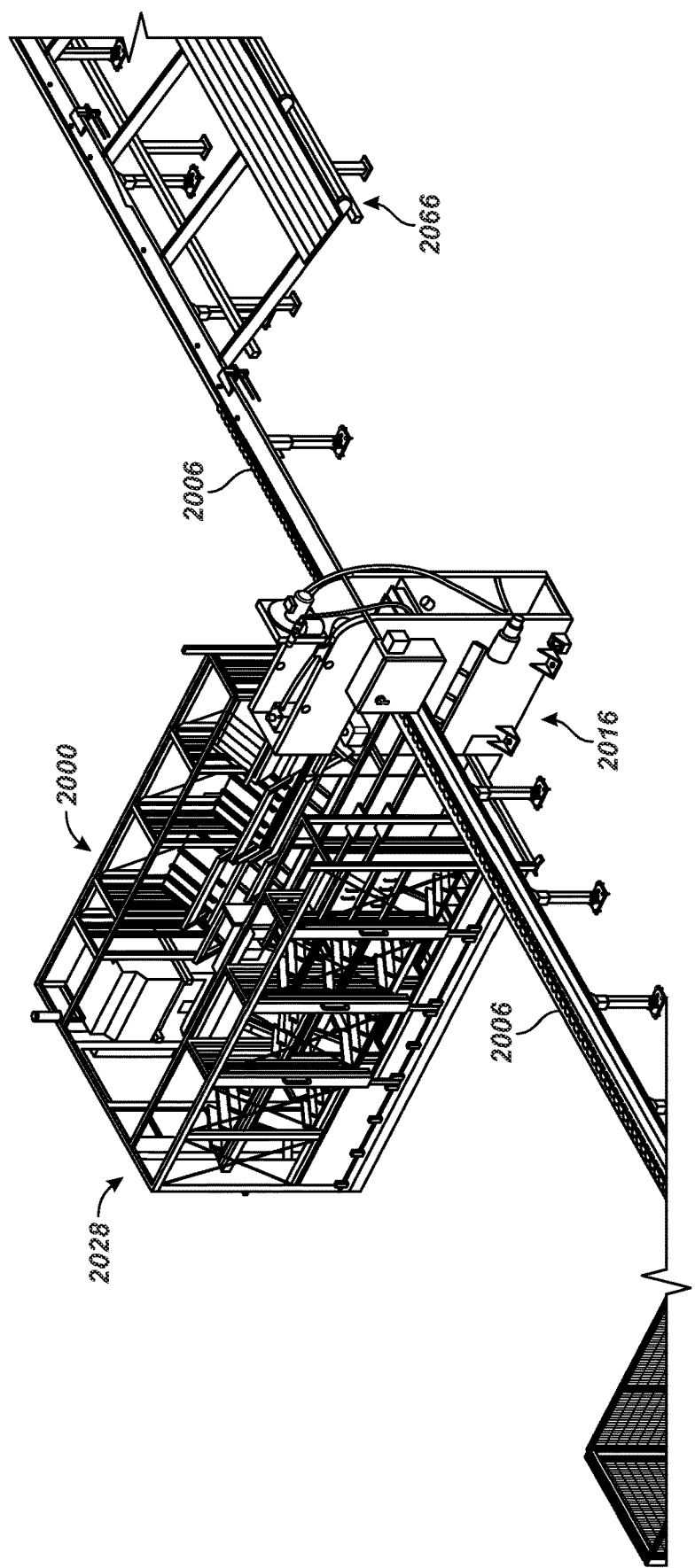
FIG. 20A is a perspective view of a pre-plating plating station 2000 of a plating system, according to an embodiment of the present disclosure.

FIG. 20A is a perspective view of a pre-plating plating station 2000 of a plating system, according to an embodiment of the present disclosure. The pre-plating plating station 2000 includes a press 2016, a plate container rack 2028, a transport 2006, and an outfeed magazine 2066. A pre-plating press loading robot (not shown in FIG. 20A but see the pre-plating press loading robot 2024 in FIG. 20B) is also included to pick a plate from containers in the plate container rack 2028 and provide the plate to a press surface. The transport 2006 positions structural members in a position to be pre-plated by the press 2016 and then transports the pre-plated structural members to the outfeed magazine 2066. As can be appreciated, in other embodiments the transport 2006 can transport the pre-plated members to another location, such as an assembly station, another station, a shipping platform, or the like.

FIG. 20B is a perspective view of the pre-plating plating station 2000 of FIG. 20A. FIG. 20B illustrates a pre-plating press loading robot 2024 placing a plate 2012 on a press surface 2034 of the press 2016. The transport 2006 has moved or is in process of moving the structural member into position to be pre-plated by the press 2016. An end-of-arm tool 2025 allows the pre-plating press loading robot 2024 to pick the plate 2012 from a container in the rack of containers 2028 and to place the plate 2012 on the press surface 2034. The plate 2012 may be picked from a container in the rack of containers 2028 based on a specification, requirement, and/or constraint of the joint being pre-plated at the joint location on the structural member 2002. The robot arm 2024 and/or end-of-arm tool 2025 is configured to orient the plate 2012 on the press surface 2034 according to the joint being pre-plated. Stated otherwise, the robot arm 2024 and/or end-of-arm tool 2025 can rotate the plate 2012 with a plane of the press surface 2034 to an orientation appropriate for a joint to be created at the joint position being pre-plated.

The press 2016 of FIG. 20B is oriented differently from the press 116 of FIG. 1A. The press 2016 of FIG. 20B has a vertical orientation to press in a downward direction. The press surface 2034 is oriented in a horizontal plane such that force of the press surface 2034 on the plate 2012 during pre-plating is in a downward direction. Because the orientation of the press is vertical, and different from the splicing press 1820 of FIG. 18B, the pre-plating system 2000 can pre-plate on a pre-plating surface 2004 of the structural member 2002 that is transverse (e.g., perpendicular to) the opposing splicing surfaces 2003 on which structural members 2002 are spliced together. Accordingly, any rotation or manipulation of a structural member 2002 (lengthened through splicing, or otherwise) is unnecessary. The transport 2006 can be a simple conveyor (or intelligent conveyor) that simply transports structural members through the plating system.

Further, the vertical orientation of the press 2016 allows accessibility to a side of the press 2016 and to the press surface 2034. The rack-side of the press 2016 of FIG. 20B is open or otherwise accessible. The pre-plating press loading robot 2024 is able to access the underside of the press surface 2034 because it is unobstructed or otherwise not blocked by structure of the press 2016. Accordingly, the pre-plating press loading robot 2024 can both pick the plate 2012 from a container in the rack of containers 2028 and correctly or otherwise appropriately orient the plate 2012 on the press surface 2034 for plating to the structural member 2002.

As can be appreciated, the press surface 2034 may be magnetic, or comprise an electromagnet, to secure the plate 2012 to the press surface 2034 until pressing into a structural member 2002 for pre-plating. In other embodiments, the press surface 2034 may comprise a plate securement mechanism, which may include functionality to orient or re-orient a plate for pre-plating.

The pre-plating press loading robot 2024 may include a securing mechanism at the end that may be similar to the securing mechanisms of the plate picking robot 110 and the press loading robot 126 described above with reference to FIG. 1A. The pre-plating press loading robot 2024 may be mounted on a trolley that traverses a track extending between multi-tiered container racks 2028 loaded with containers 2026 filled with plates 2012 of various shapes and/or sizes. The containers 2026 are located within reach of the pre-plating press loading robot 2024 to enable the pre-plating press loading robot 2024 to retrieve plates 2012 from the containers 2026. The joints of the pre-plating press loading robot 2024 enable the pre-plating press loading robot 2024 to reach plates 2012 located within any of the containers 2026. The plates 2012 may be organized into specific locations within the container racks 2028 and containers 2026 so that the pre-plating press loading robot 2024 can traverse the track to the location of a certain one of the containers 2026 and pick the proper plate therefrom. The pre-plating press loading robot 2024 then, if needed, traverses the track to within reach of the press surface 2034 and positions the plate 2012 on the press surface 2034. The plates 2012 may be organized by size and/or shape within the containers 2026 so that the pre-plating press loading robot 2024 can retrieve a plate 2012 of a desired shape and/or size from a known location.

Figure 20C:
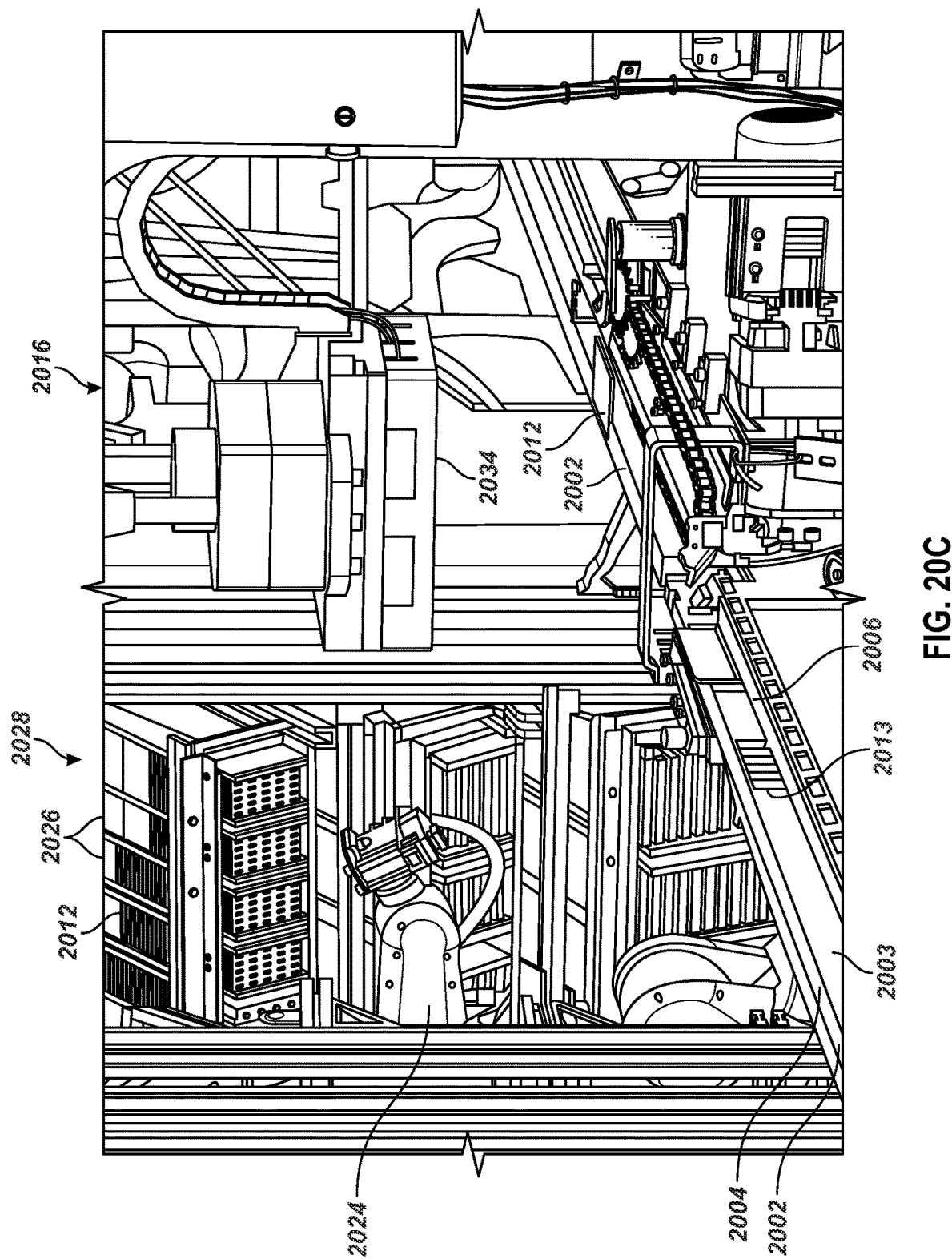
FIG. 20C is another perspective view of the pre-plating plating station of FIG. 20A.

FIG. 20C is another perspective of the pre-plating plating station 2000 of FIG. 20A. The perspective view of FIG. 20C illustrates the transport 2006, the press 2016, and the plate container rack 2028. The press 2016, and more specifically the press surface 2034, pressed the plate 2012 into the structural member 2002 to pre-plate the structural member 2002 at a joint position. The plate 2012 is on a pre-plating surface 2004 that is orthogonal to the opposing vertical surfaces 2003 where a plate 2013 is splicing two structural members 2002 into a lengthened structural member 2002.

The perspective view of FIG. 20C also illustrates plates 2012 loaded into plate containers 2026 of the plate container rack 2028. The pre-plating press loading robot 2024 is able to select a plate 2012 from a selected plate container 2026 as appropriate for a joint to be created at the joint position being pre-plated.

EXAMPLES

Some examples of embodiments of the present disclosure are provided below.

Example 1. A plating system to plate structural members, comprising: a splicing system to splice together structural members into a lengthened structural member, the splicing system comprising: a splicing press to plate the structural members on opposing (e.g., vertical) surfaces and at overlapping abutting ends to splice together the abutting ends to form the lengthened structural member; and a splicing press loading robot to position splicing plates to be plated to the structural members by the splicing press; and a pre-plating system to pre-plate the lengthened structural member at one or more joint locations, the pre-plating system comprising: a pre-plating press to pre-plate the lengthened structural member at a joint position on a surface of the lengthened structural member that is transverse to the opposing surfaces of the lengthened structural member; and a pre-plating press loading robot to position a plate on a press surface of the pre-plating press at a desired orientation according to a configuration of a joint to be formed at the joint position, the pre-plating press loading robot to pick pre-plating plates from a pre-plating plate container; and a transport to position the structural members in abutment at the abutting ends and within the splicing press to be plated on the opposing (e.g., vertical) surfaces for forming the lengthened structural member, to transport the lengthened structural member from the splicing system to the pre-plating system, and to position the lengthened structural member within the pre-plating press to be pre-plated at the joint position.

Example 2. The plating system of Example 1, wherein the transport comprises a conveyor system.

Example 3. The plating system of Example 1, wherein the transport comprises a splicing infeed conveyor and a splicing outfeed conveyor.

Example 4. The plating system of Example 1, wherein the splicing press comprises a pair of cams each positioned on opposing sides of the transport and configured to rotate from an open position out of contact with the structural members to a pressing position in contact with the respective opposing surfaces to press the splicing plates into the abutting ends of the structural members.

Example 5. The plating system of Example 4, wherein the pair of cams rotate through the pressing position to return to the open position, and wherein the rotation of the pair of cams propels the lengthened structural member.

Example 6. The plating system of Example 1, wherein the splicing press loading robot is configured to pick the splicing plates from one of a plurality of splicing plate containers.

Example 7. The plating system of Example 1, wherein the splicing press of the splicing system further comprises a pair of press surfaces to receive splicing plates from the splicing press loading robot, the press surfaces to maintain the pair of splicing plates in an appropriate position on opposing sides of the structural members for the splicing press to plate the structural members.

Example 8. The plating system of Example 7, wherein the press surfaces each comprise a magnet (e.g., an electromagnet) to secure a plate of the pair of splicing plates to maintain the plate in the appropriate position.

Example 9. The plating system of Example 1, wherein the press surface of the pre-plating press is oriented horizontally to be orthogonal to the opposing surfaces.

Example 10. The plating system of Example 9, wherein the press surface of the pre-plating press is oriented to press the plate in a downward direction to pre-plate lengthened structural member.

Example 11. The plating system of Example 1, further comprising:
an electromagnet positioned to secure the plate on the press surface and maintain the plate at the desired orientation for the pre-plating press to pre-plate at the joint position.

Example 12. The plating system of Example 1, wherein the transport is configured to rotate the lengthened structural member about a longitudinal axis to facilitate the pre-plating press pre-plating the lengthened structural member on a surface transverse to the opposing surfaces.

Example 13. A method of plating structural members, comprising: delivering, via an infeed robot (e.g., which may be an intelligent conveyor), a first structural member to a splicing station; delivering, via the infeed robot, a second structural member to the splicing station; positioning the first and second structural members end to end within a splicing press of the splicing station; picking, via a plate picking robot, a pair of splicing plates; positioning, via a plate picking robot, the pair of splicing plates at the splicing press on opposing sides of the first and second structural members; pressing, with a press, the pair of plates into splicing surfaces on opposing sides of the first and second structural members to splice the first and second structural member to form a lengthened structural member; delivering, via a second infeed robot, the lengthened structural member to a pre-plating station; picking, via a pre-plate picking robot, a plate for pre-plating a joint position; positioning the plate at a pre-plate press of the pre-plating station; positioning the lengthened structural member in the press of the pre-plating station; pressing the plate into a pre-plate surface of the lengthened structural, wherein the pre-plate surface is transverse to (e.g., perpendicular or orthogonal to) the splicing surfaces; and transferring, via an outfeed robot, the lengthened and now pre-plated structural member out of the pre-plating station for use in assembling a building component.

Example 14. The method of plating structural members of Example 13, further comprising rotating the longer structural member about a longitudinal axis to facilitate pre-plating on a pre-plate surface transverse to the splicing surfaces.

Example 15. The method of plating structural members of Example 13, further comprising optionally repeating pre-plating at multiple joint positions along a length of the lengthened structural member.

Example 16. A splicing system to splice together structural members into a lengthened structural member, the splicing system comprising: a splicing press to plate a pair of structural members on opposing (e.g., vertical) surfaces and at overlapping abutting ends to splice together the abutting ends to form a lengthened structural member; a splicing press loading robot to position splicing plates to be plated to the pair of structural members by the splicing press; a transport to position the pair of structural members in abutment at the abutting ends and within the splicing press to be plated on the opposing (vertical) surfaces for forming the lengthened structural member; and a splice guide to be positioned at the transport to guide a non-spliced structural member on the transport while passing through the splicing system un-spliced (e.g., without being spliced).

Example 17. The splicing system of Example 16, wherein the splicing press further comprises a pair of press surfaces to receive splicing plates from the splicing press loading robot, the pair of press surfaces to maintain the pair of splicing plates in an appropriate position on opposing sides of the structural members for the splicing press to plate the structural members.

Example 18. The splicing system of Example 16, wherein the splicing press loading robot is further to position the splice guide to be positioned at the transport.

Example 19. The splicing system of Example 16, wherein the splice guide is raised into a guiding position from a lowered splicing position, according to the structural member on the transport being determined to be a non-spliced structural member.

Example 20. The splicing system of Example 17, wherein the splice guide is raised into the guiding position from a lowered splicing position, further based on the structural member on the transport being determined to be of a length shorter than a distance between fixed guides at an infeed and at an outfeed of the splicing system.

Example 21. The splicing system of Example 16, wherein the splicing press comprises a pair of cams each positioned on opposing sides of the transport and configured to rotate from an open position out of contact with the structural members to a pressing position in contact with the respective opposing surfaces to press the splicing plates into the abutting ends of the structural members.

Example 22. The splicing system of Example 21, wherein the pair of cams rotate through the pressing position to return to the open position, and wherein the rotation of the pair of cams propels the lengthened structural member.

Example 23. A plating system to plate structural members, comprising: a first press to plate structural members on opposing (e.g., vertical) surfaces and at overlapping abutting ends to splice together the abutting ends to form a lengthened structural member; and a first press loading robot to position splicing plates to be plated to the structural members by the first press, the first press loading robot to pick splicing plates from a splicing plate container; a second press to pre-plate the lengthened structural member at a joint position on a surface of the lengthened structural member that is transverse to the opposing surfaces; and a second press loading robot to position a plate on a plate surface of the second press at a desired orientation according to a configuration of a joint to be formed at the joint position, the second press loading robot to pick pre-plating plates from a pre-plating plate container; and a conveyor to position the structural members in abutment at the abutting ends and within the first press to be plated on the opposing (e.g., vertical) surfaces for forming the lengthened structural member, to transport the lengthened structural member from the first press to the second press, and to position the lengthened structural member within the second press to be pre-plated at the joint position.

It will be apparent to those having ordinary skill that many embodiments, though not expressly discussed herein, may exist that fall within the scope of the present disclosure and that changes may be made to the details of the above-described embodiments without departing from the underlying principles of the present disclosure. The scope of the present invention should, therefore, be determined only by the following claims.

The invention claimed is:

1. A plating system to plate structural members, comprising:
   a splicing system to splice together structural members into a lengthened structural member, the splicing system comprising:
   a splicing press to plate the structural members on opposing surfaces and at overlapping abutting ends to splice together the abutting ends to form the lengthened structural member; and
   a splicing press loading robot to position splicing plates to be plated to the structural members by the splicing press; and
   a pre-plating system to pre-plate the lengthened structural member at one or more joint locations, the pre-plating system comprising:
   a pre-plating press to pre-plate the lengthened structural member at a joint position on a surface transverse to the opposing surfaces; and
   a pre-plating press loading robot to position a plate on a press surface of the pre-plating press at a desired orientation according to a configuration of a joint to be formed at the joint position; and
   a transport to position the structural members in abutment at the abutting ends and within the splicing press to be plated on the opposing surfaces for forming the lengthened structural member, to transport the lengthened structural member from the splicing system to the pre-plating system, and to position the lengthened structural member within the pre-plating press to be pre-plated at the joint position.

2. The plating system of claim 1, wherein the transport comprises a conveyor system.

3. The plating system of claim 1, wherein the splicing press comprises a pair of cams each positioned on opposing sides of the transport and configured to rotate from an open position out of contact with the structural members to a pressing position in contact with the respective opposing surfaces to press the splicing plates into the abutting ends of the structural members.

4. The plating system of claim 3, wherein the pair of cams rotate through the pressing position to return to the open position, and wherein the rotation of the pair of cams propels the lengthened structural member.

5. The plating system of claim 1, wherein the splicing press loading robot is configured to pick the splicing plates from one of a plurality of splicing plate containers.

6. The plating system of claim 1, wherein the splicing press further comprises a pair of press surfaces to receive splicing plates from the splicing press loading robot, the press surfaces to maintain the pair of splicing plates in an appropriate position on opposing sides of the structural members for the splicing press to plate the structural members.

7. The plating system of claim 1, wherein the press surface of the pre-plating press is oriented horizontally to be orthogonal to the opposing surfaces.

8. The plating system of claim 7, wherein the press surface of the pre-plating press is oriented to press the plate in a downward direction to pre-plate lengthened structural member.

9. The plating system of claim 1, further comprising:
an electromagnet positioned to secure the plate on the press surface and maintain the plate at the desired orientation for the pre-plating press to pre-plate at the joint position.

10. The plating system of claim 1, wherein the transport is configured to rotate the lengthened structural member about a longitudinal axis to facilitate the pre-plating press pre-plating the lengthened structural member on a surface transverse to the opposing surfaces.

11. A method of plating structural members, comprising:
delivering, via an infeed robot, a first structural member to a splicing station;
delivering, via the infeed robot, a second structural member to the splicing station;
positioning the first and second structural members end to end within a splicing press of the splicing station;
picking, via a plate picking robot, a pair of splicing plates;
positioning, via a plate picking robot, the pair of splicing plates at the splicing press on opposing sides of the first and second structural members;
pressing, with a press, the pair of plates into splicing surfaces on opposing sides of the first and second structural members to splice the first and second structural member to form a lengthened structural member;
delivering, via a second infeed robot, the lengthened structural member to a pre-plating station;
picking, via a pre-plate picking robot, a plate for pre-plating a joint position;
positioning the plate at a pre-plate press of the pre-plating station;
positioning the lengthened structural member in the press of the pre-plating station;
pressing the plate into a pre-plate surface of the lengthened structural, wherein the pre-plate surface is transverse to the splicing surfaces; and
transferring, via an outfeed robot, the lengthened and now pre-plated structural member out of the pre-plating station for use in assembling a building component.

12. The method of plating structural members of claim 11, further comprising rotating the longer structural member about a longitudinal axis to facilitate pre-plating on the pre-plate surface transverse to the splicing surfaces.

13. The method of plating structural members of claim 11, further comprising optionally repeating pre-plating at multiple joint positions along a length of the lengthened structural member.

14. A splicing system comprising:
a splicing press to plate a pair of structural members on opposing surfaces and at overlapping abutting ends to splice together the abutting ends to form a lengthened structural member;
a splicing press loading robot to position splicing plates to be plated to the pair of structural members by the splicing press;
a transport to position the pair of structural members in abutment at the abutting ends and within the splicing press to be plated on the opposing surfaces for forming the lengthened structural member; and
a splice guide to be positioned at the transport to guide a non-spliced structural member on the transport while passing through the splicing system un-spliced.

15. The splicing system of claim 14, wherein the splicing press further comprises a pair of press surfaces to receive splicing plates from the splicing press loading robot, the pair of press surfaces to maintain the pair of splicing plates in an appropriate position on opposing sides of the structural members for the splicing press to plate the structural members.

16. The splicing system of claim 14, wherein the splicing press loading robot is further to position the splice guide to be positioned at the transport.

17. The splicing system of claim 14, wherein the splice guide is raised into a guiding position from a lowered a splicing position, according to the structural member on the transport being determined to be a non-spliced structural member.

18. The splicing system of claim 17, wherein the splice guide is raised into the guiding position from a lowered splicing position, further based on the structural member on the transport being determined to be of a length shorter than a distance between fixed guides at an infeed and at an outfeed of the splicing system.

19. The splicing system of claim 14, wherein the splicing press comprises a pair of cams each positioned on opposing sides of the transport and configured to rotate from an open position out of contact with the structural members to a pressing position in contact with the respective opposing surfaces to press the splicing plates into the abutting ends of the structural members.

20. The splicing system of claim 19, wherein the pair of cams rotate through the pressing position to return to the open position, and wherein the rotation of the pair of cams propels the lengthened structural member.

* * * * *